United States Patent
Park et al.

(10) Patent No.: US 10,720,972 B2
(45) Date of Patent: Jul. 21, 2020

(54) METHOD FOR TRANSMITTING AND RECEIVING CHANNEL STATE INFORMATION IN WIRELESS COMMUNICATION SYSTEM AND DEVICE THEREFOR

(71) Applicant: LG ELECTRONICS INC., Seoul (KR)

(72) Inventors: Jonghyun Park, Seoul (KR); Hyungtae Kim, Seoul (KR); Kijun Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 50 days.

(21) Appl. No.: 15/762,917

(22) PCT Filed: Sep. 26, 2016

(86) PCT No.: PCT/KR2016/010763
§ 371 (c)(1),
(2) Date: Mar. 23, 2018

(87) PCT Pub. No.: WO2017/052330
PCT Pub. Date: Mar. 30, 2017

(65) Prior Publication Data
US 2018/0294848 A1 Oct. 11, 2018

Related U.S. Application Data

(60) Provisional application No. 62/232,429, filed on Sep. 24, 2015.

(51) Int. Cl.
*H04L 1/00* (2006.01)
*H04B 7/0417* (2017.01)
(Continued)

(52) U.S. Cl.
CPC ......... *H04B 7/0417* (2013.01); *H04B 7/0452* (2013.01); *H04B 7/063* (2013.01);
(Continued)

(58) Field of Classification Search
None
See application file for complete search history.

(56) References Cited

U.S. PATENT DOCUMENTS

2015/0200757 A1 7/2015 Wu et al.
2015/0341093 A1* 11/2015 Ji .................. H04B 1/707
375/267
(Continued)

FOREIGN PATENT DOCUMENTS

KR 10-2013-0050273 A 5/2013
WO WO 2014/116928 A1 7/2014

OTHER PUBLICATIONS

Catt, "CSI-RS measurement restriction for beamformed CSI-RS," 3GPP TSG RAN WG1 Meeting #82, R1-154752, Beijing, P.R. China, Aug. 24-28, 2015, 4 pages.
(Continued)

*Primary Examiner* — Brandon M Renner
(74) *Attorney, Agent, or Firm* — Birch, Stewart, Kolasch & Birch, LLP

(57) ABSTRACT

Disclosed are a method for transmitting and receiving channel state information in a wireless communication system and a device therefor. Specifically, a method for transmitting channel state information (CSI) by a terminal in a wireless communication system may comprise the steps of: receiving, from a base station, setting information for a single CSI process including a first channel state information-reference signal (CSI-RS) configuration, which is associated with K CSI-RS resources of a beamformed CSI-RS type, K being greater than one, and a second CSI-RS configuration, which
(Continued)

is associated with one CSI-RS resource of the beamformed CSI-RS type; reporting, to the base station, an indicator indicating a CSI-RS resource selected from among the K CSI-RS resources; and reporting, to the base station, a channel quality indicator (CQI)/precoding matrix indicator (PMI)/rank indicator (RI) derived on the basis of the one CSI-RS resource.

15 Claims, 11 Drawing Sheets

(51) Int. Cl.
    *H04L 5/00*     (2006.01)
    *H04W 24/10*     (2009.01)
    *H04B 7/06*     (2006.01)
    *H04B 7/0452*     (2017.01)
    *H04W 72/04*     (2009.01)

(52) U.S. Cl.
    CPC .......... *H04L 5/0051* (2013.01); *H04L 5/0053* (2013.01); *H04L 5/0057* (2013.01); *H04W 24/10* (2013.01); *H04W 72/042* (2013.01); *H04B 7/0626* (2013.01); *H04B 7/0632* (2013.01); *H04B 7/0639* (2013.01); *H04L 5/005* (2013.01); *H04L 5/0023* (2013.01)

(56) References Cited

U.S. PATENT DOCUMENTS

| | | | | |
|---|---|---|---|---|
| 2015/0341100 A1* | 11/2015 | Kwak | ................. | H04B 7/0626 370/329 |
| 2016/0142189 A1* | 5/2016 | Shin | ..................... | H04L 5/0048 370/329 |
| 2016/0164588 A1* | 6/2016 | Chen | .................... | H04B 7/0469 375/267 |
| 2016/0323855 A1* | 11/2016 | Nakamura | ............ | H04L 1/0003 |
| 2017/0331535 A1* | 11/2017 | Wei | ....................... | H04B 7/0469 |
| 2018/0220406 A1* | 8/2018 | Mizusawa | ................ | H04B 7/04 |

OTHER PUBLICATIONS

Ericsson, "CSI feedback for FD-MIMO," 3GPP TSG-RAN WG1#82, R1-154950, Beijing, China, Aug. 24-28, 2015, 5 pages.
NTT Docomo, "Views on Beamformed CSI-RS Based Enhancement," 3GPP TSG RAN WG1 Meeting #82, R1-154661, Beijing, China, Aug. 24-28, 2015, pp. 1-4.
LG Electronics, "CSI process and CSI-RS configurations for supporting EBF/FD-MIMO", R1-154272: 3GPP TSG RAN WG1 Meeting #82 Beijing, China, Aug. 24-28, 2015, pp. 1-3.
Samsung, "CSI process and CSI-RS configuration for Rel.13 FD-MIMO", R1-154156: 3GPP TSG RAN WG1 Meeting #82 Beijing, China, Aug. 24-28, 2015, pp. 1-5.
Samsung, "Discussions on Hybrid CSI-RS configurations", R1-154162: 3GPP TSG RAN WG1 Meeting #82 Beijing, China, Aug. 24-28, 2015, pp. 1-2.
Catt, "Discussion on the feedback framework for beamformed CSI-RS", 3GPP TSG RAN WG1 Meeting #82, R1-154226, Beijing, China, Aug. 24-28, 2015, 3 pages.
Catt, "On the definition of CSI-RS resource and CSI-process for EB/FD-MIMO", 3GPP TSG RAN WG1 Meeting #82, R1-153931, Beijing, China, Aug. 24-28, 2015, 3 pages.
Ericsson, "CSI feedback for FD-MIMO", 3GPP TSG-RAN WG1#82, R1-154950, Beijing, Chia, Aug. 24-28, 2015, 5 pages.
ETRI, "Discussion on configuration of CSI measurement and feedback for EB/FD-MIMO", 3GPP TSG RAN WG1 Meeting #82, R1-154394, Beijing, China, Aug. 24-28, 2015, 3 pages.
LG Electronics, "Beamformed CSI-RS related enhancements based on the identified approaches", 3GPP TSG RAN WG1 Meeting #82, R1-154274, Beijing, China, Aug. 24-28, 2015, 7 pages.

\* cited by examiner

【FIG. 1】
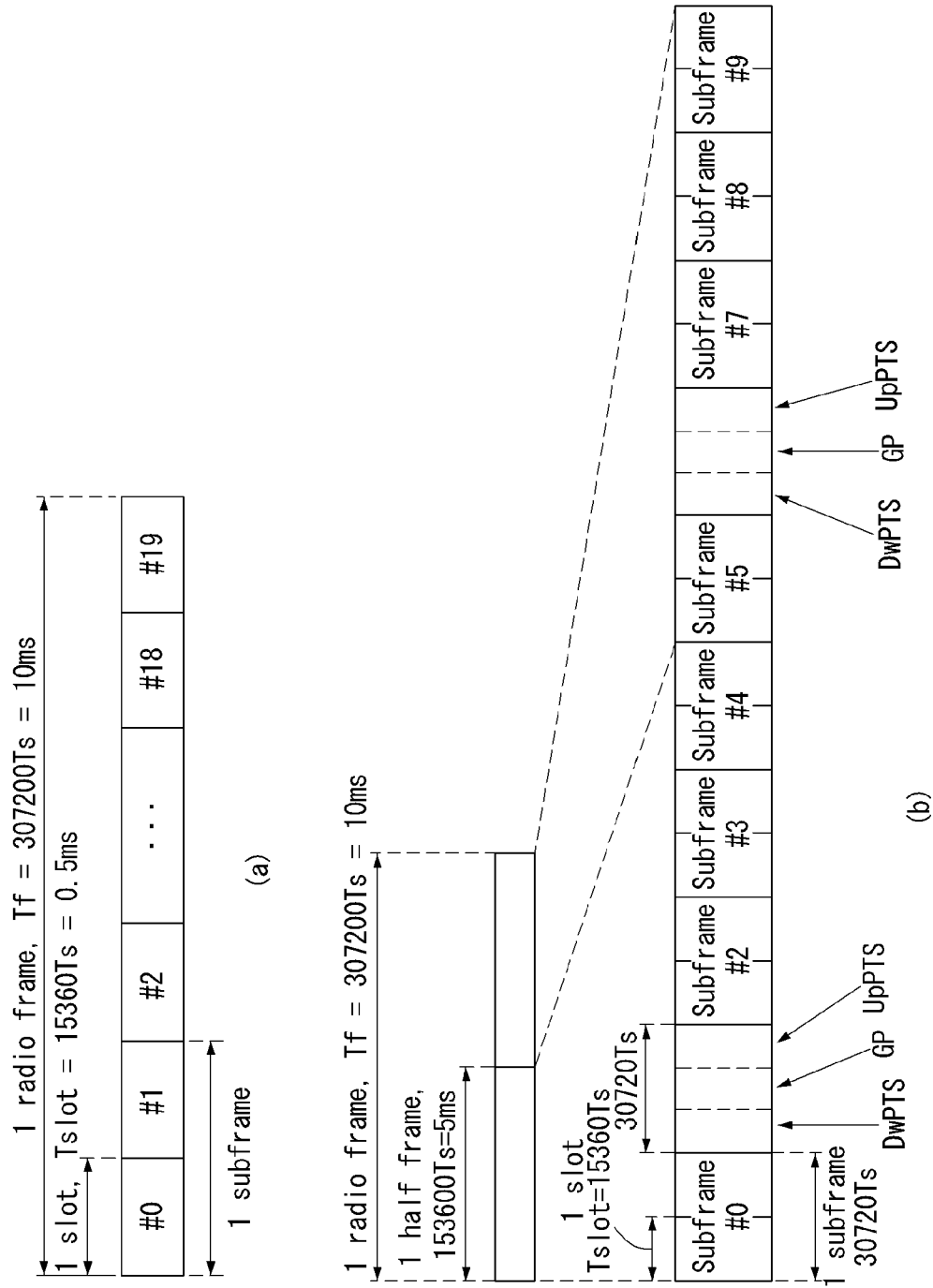

[FIG. 2]
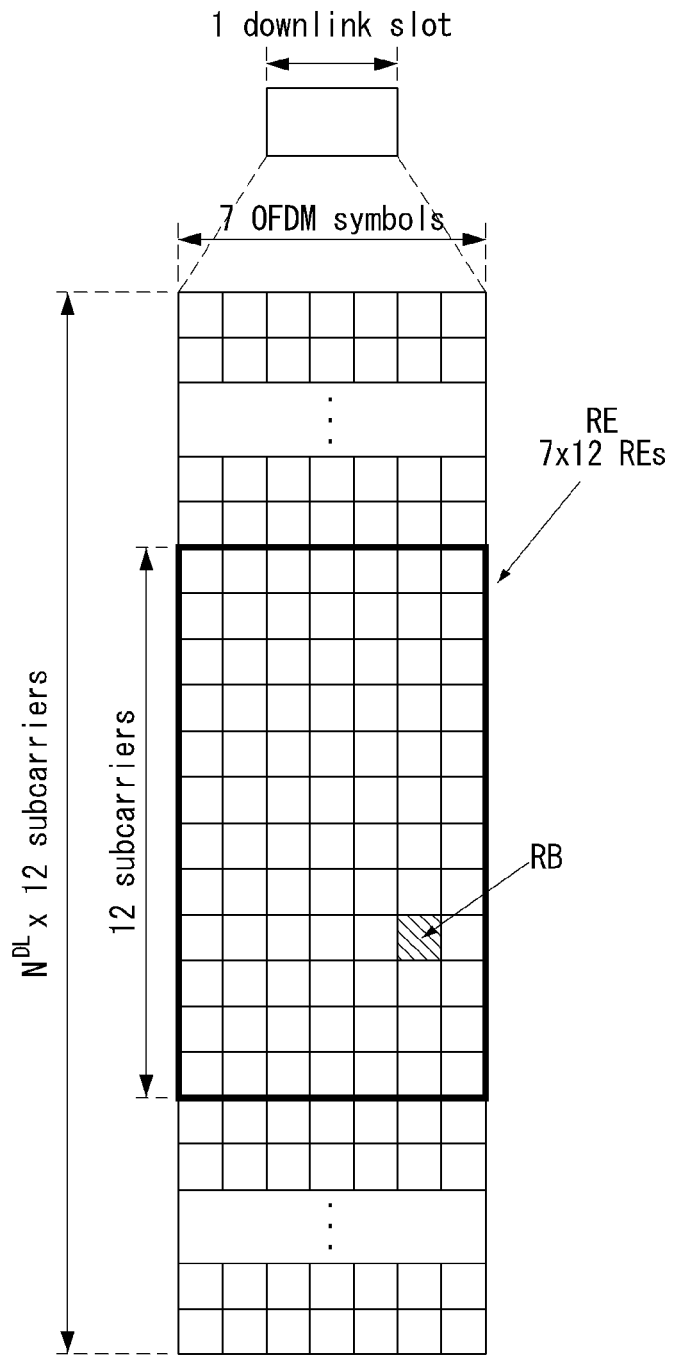

【FIG. 3】
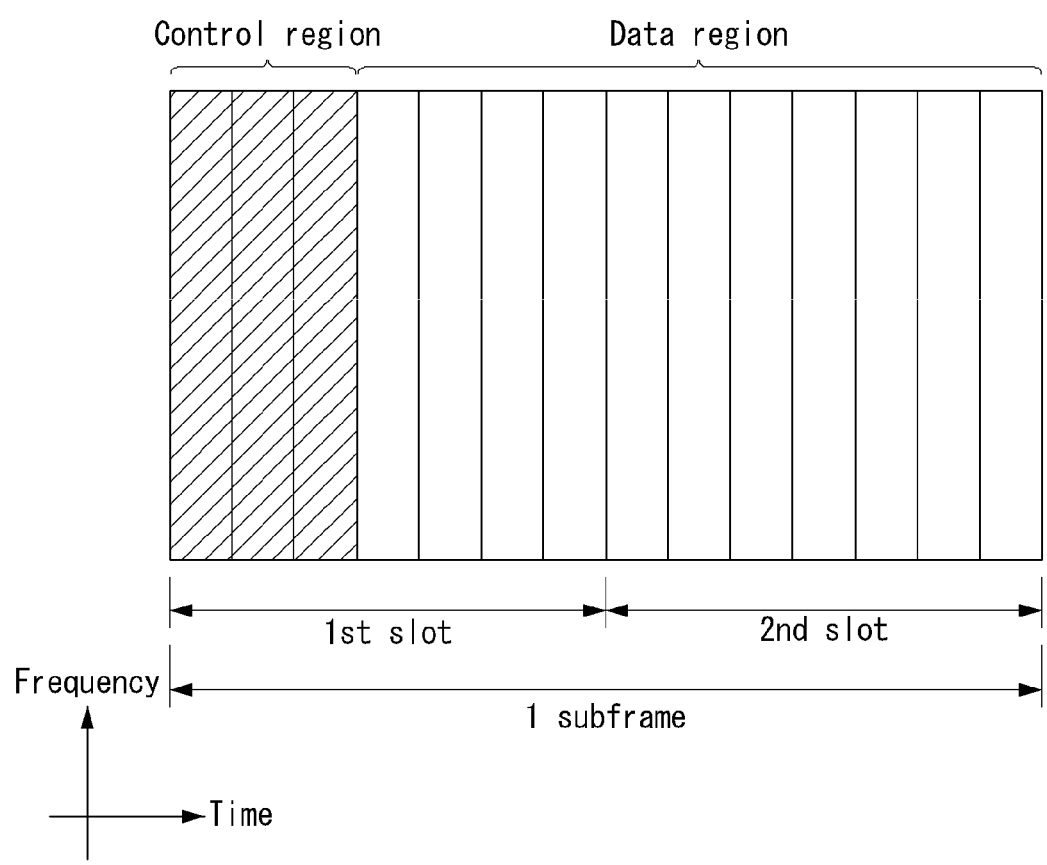

[FIG. 4]
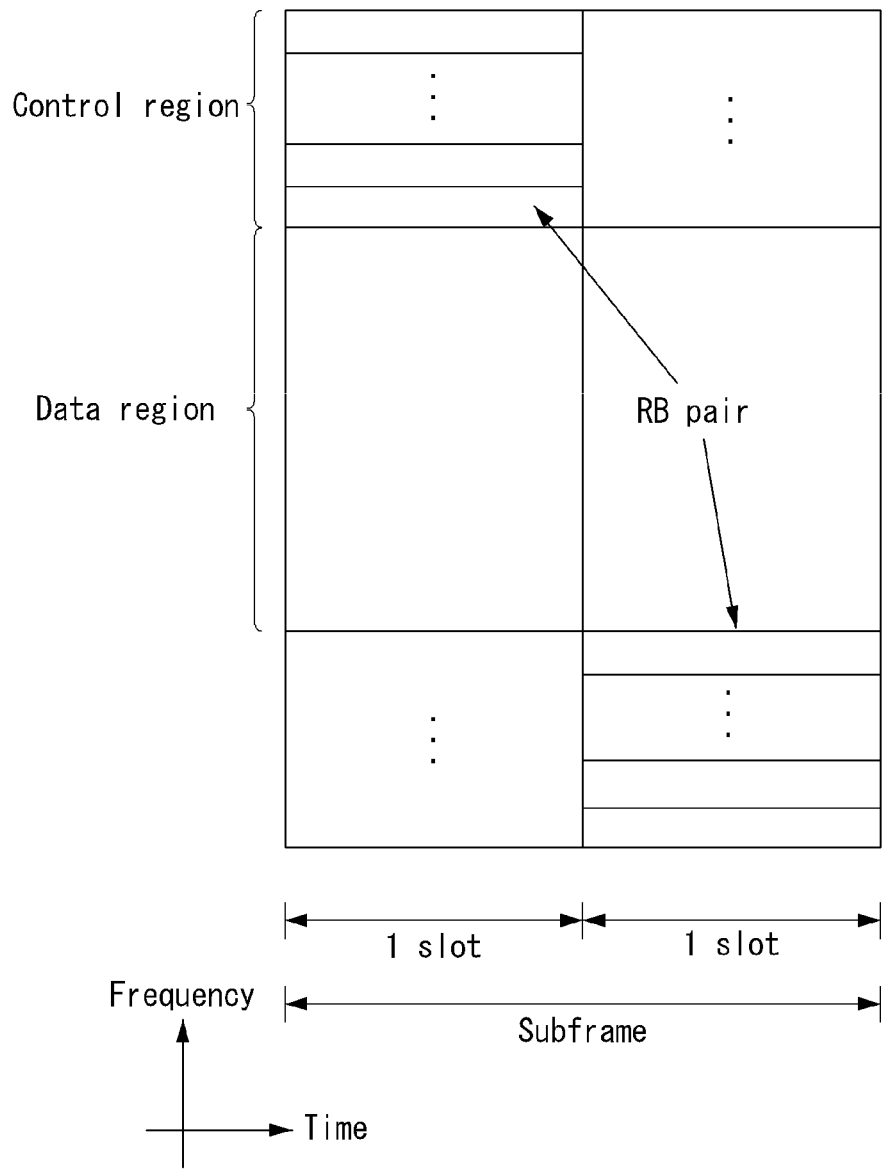

[FIG. 5]
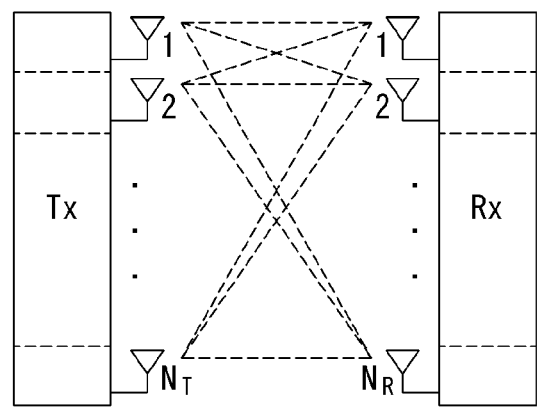
[FIG. 6]
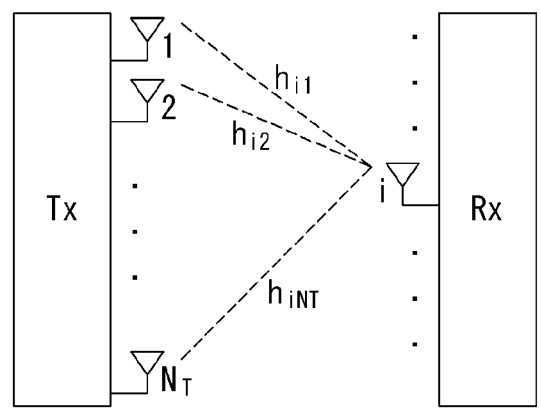

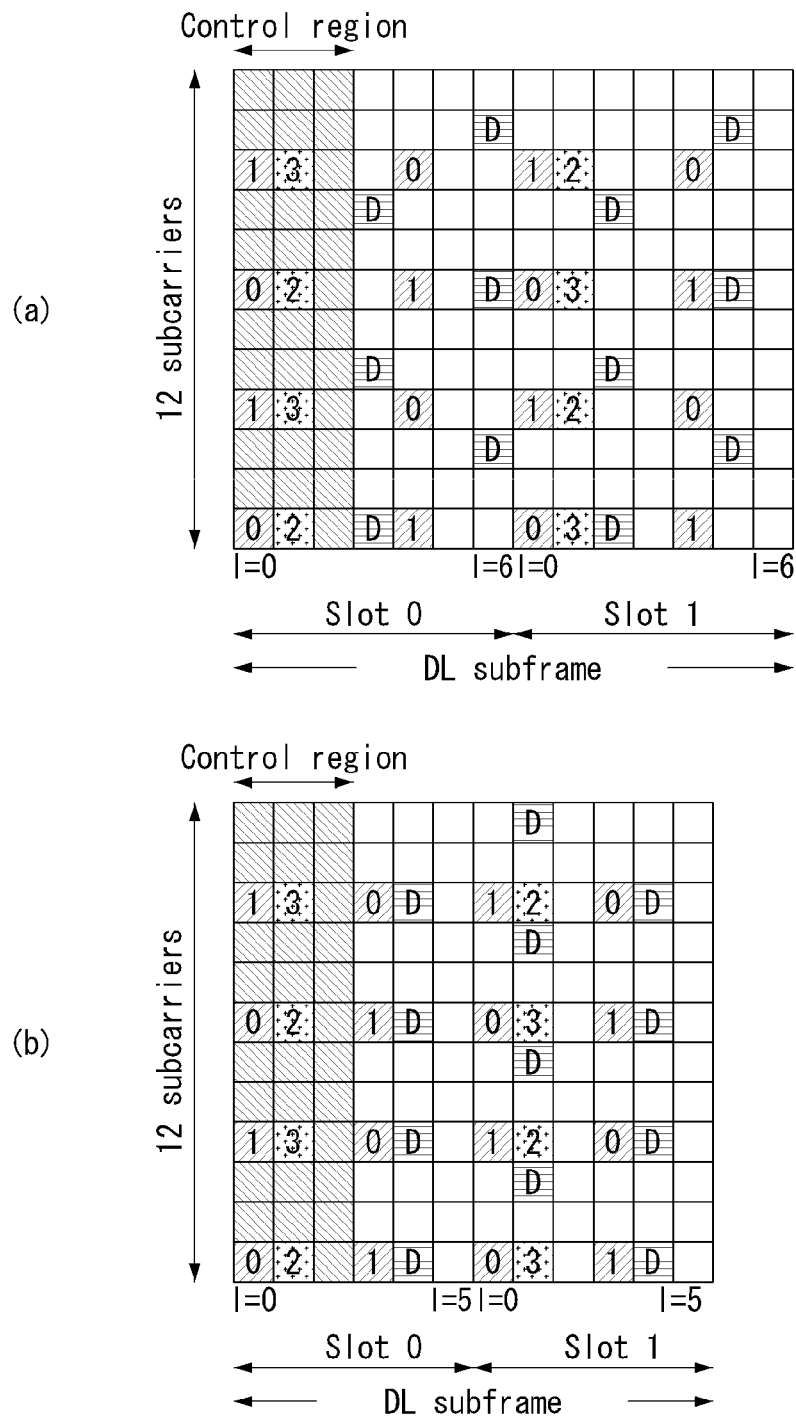
[FIG. 7]

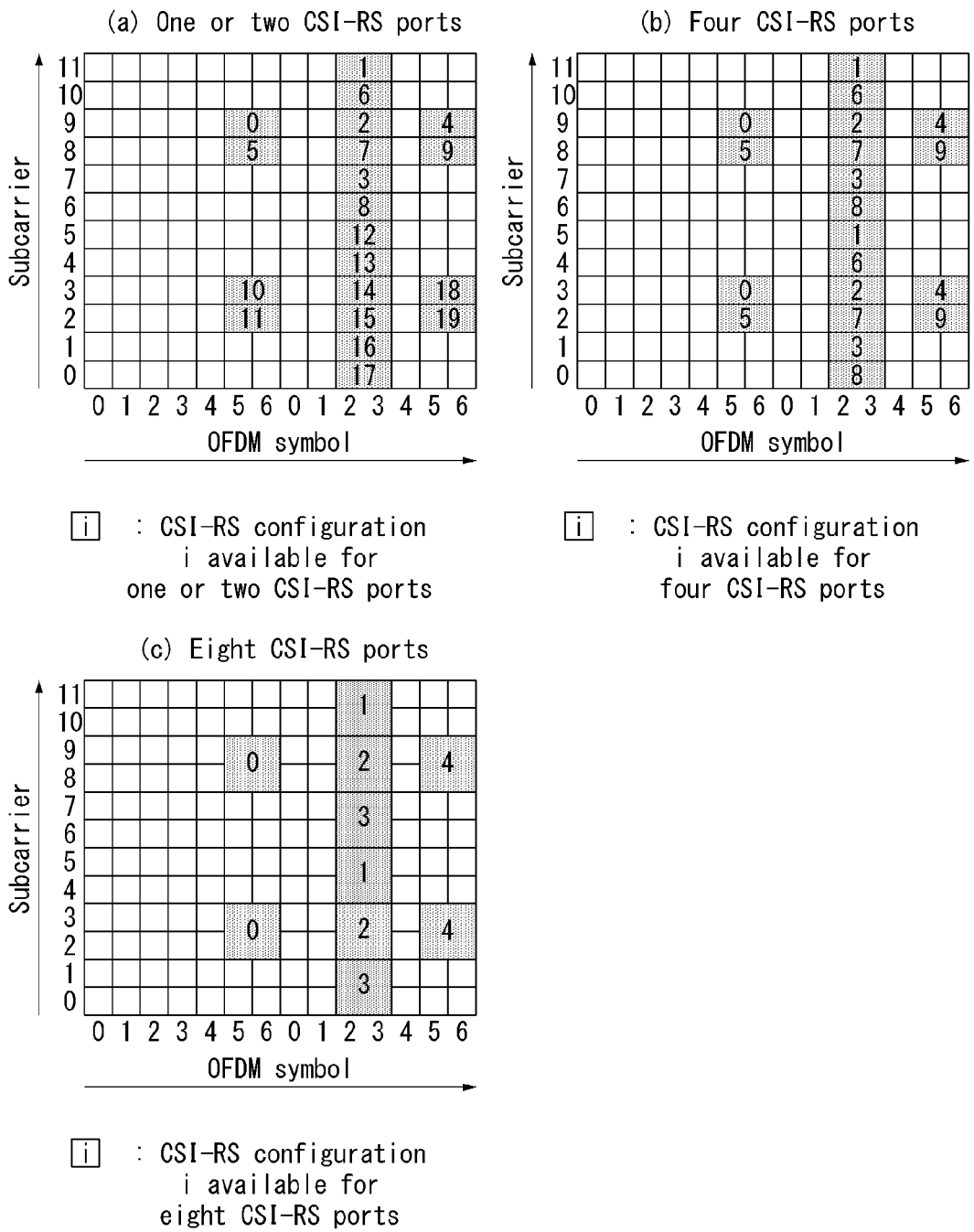

【FIG. 9】
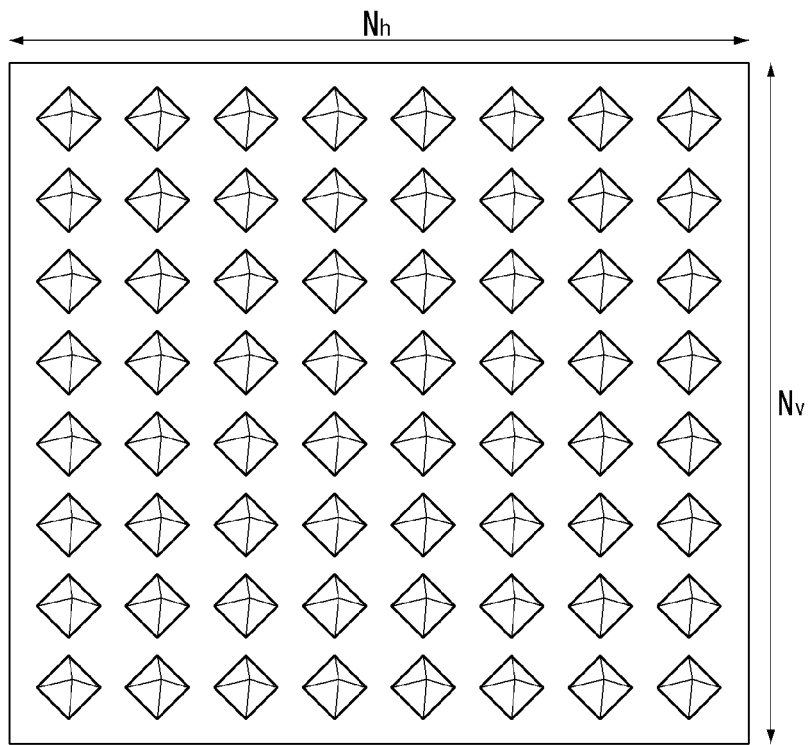
【FIG. 10】
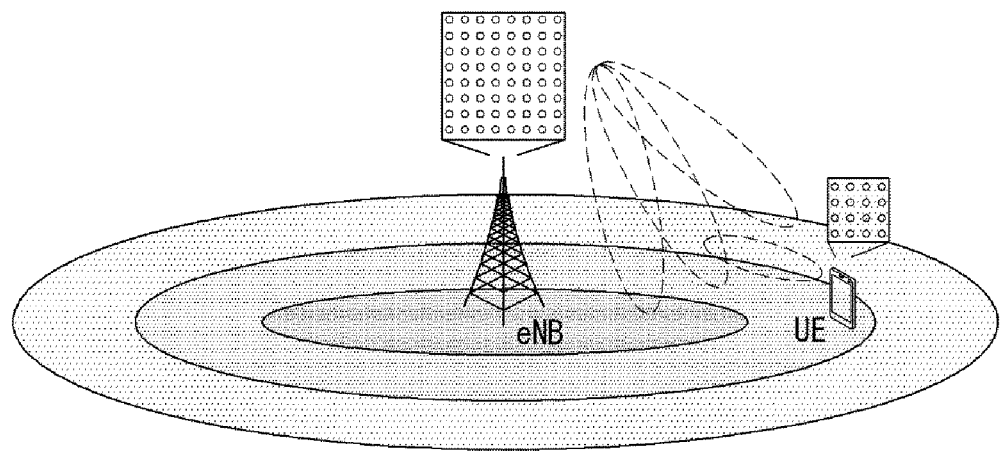

[FIG. 11]
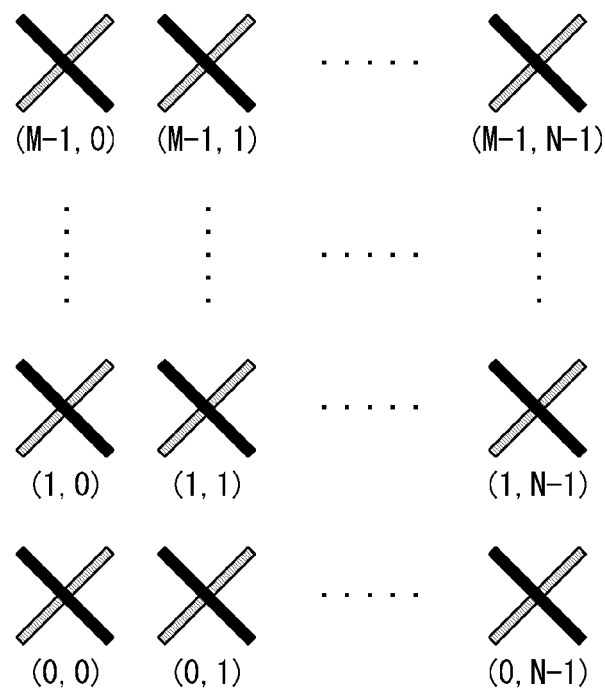

[FIG. 12]
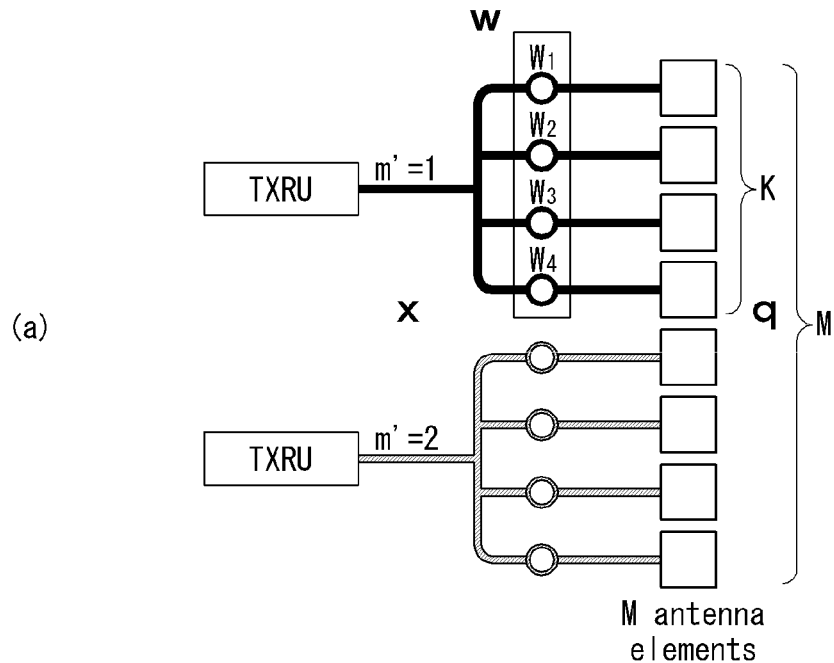
(a)
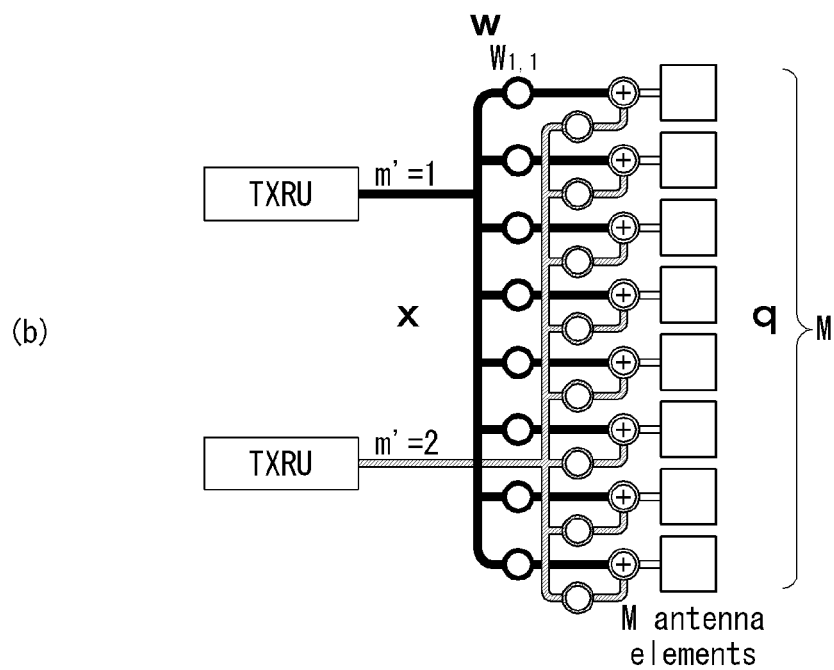
(b)

[FIG. 13]
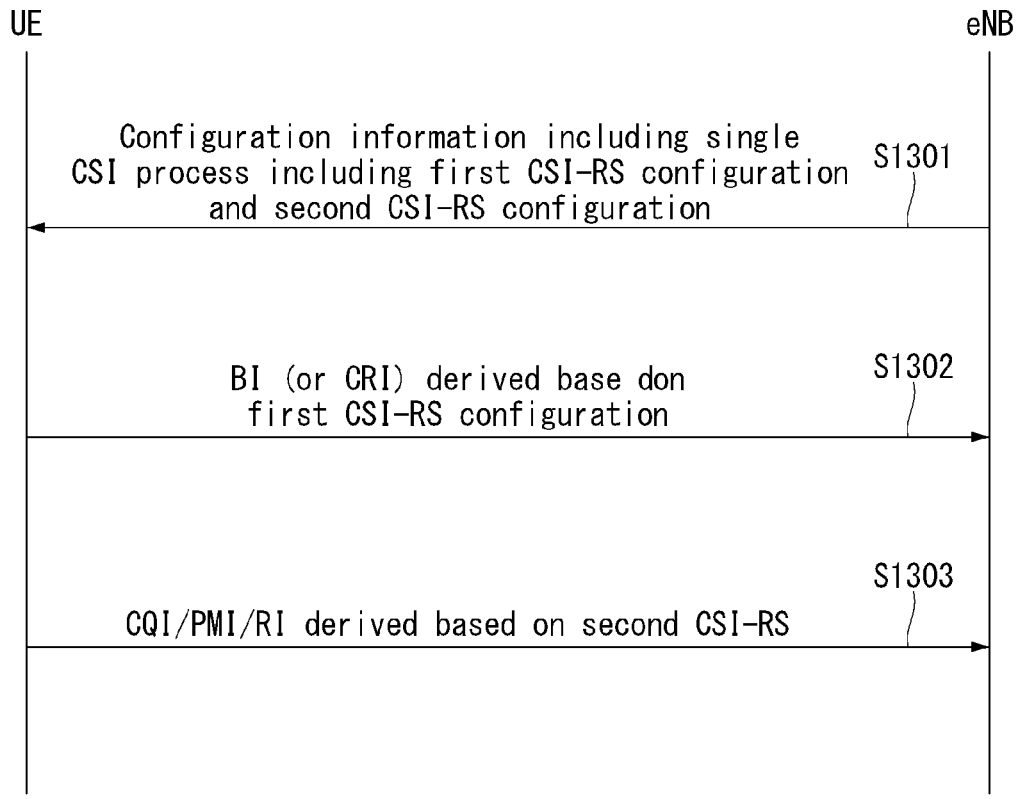
[FIG. 14]
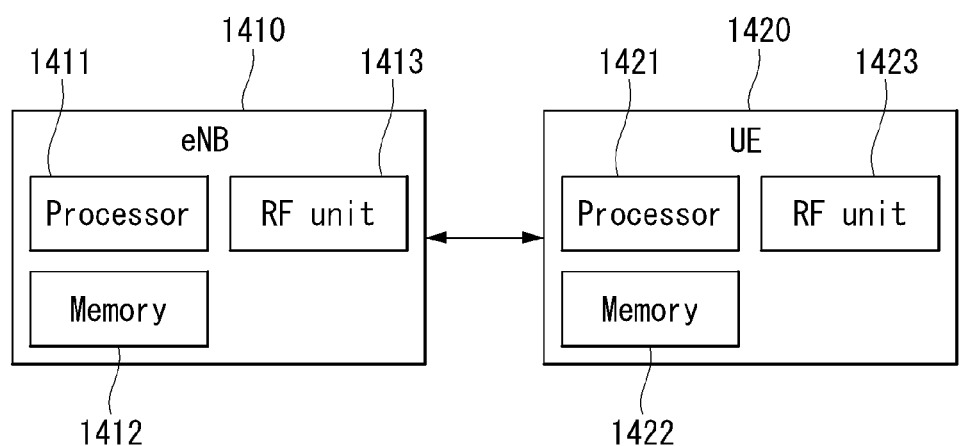

METHOD FOR TRANSMITTING AND RECEIVING CHANNEL STATE INFORMATION IN WIRELESS COMMUNICATION SYSTEM AND DEVICE THEREFOR

CROSS REFERENCE TO RELATED APPLICATIONS

This application is the National Phase of PCT International Application No. PCT/KR2016/010763, filed on Sep. 26, 2016, which claims priority under 35 U.S.C. 119(e) to U.S. Provisional Application No. 62/232,429, filed on Sep. 24, 2015, all of which are hereby expressly incorporated by reference into the present application.

TECHNICAL FIELD

The present invention relates to a wireless communication system and, more particularly, to a method for transmitting or receiving channel state information and an apparatus supporting the same.

BACKGROUND ART

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for a high speed services, requiring advanced mobile communication systems.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive Multiple Input Multiple Output (MIMO), in-band full duplex, non-orthogonal multiple access (NOMA), supporting super-wide band, and device networking, have been researched.

DISCLOSURE

Technical Problem

An object of the present invention proposes a method for transmitting or receiving channel state information.

Furthermore, an object of the present invention proposes a method of transmitting or receiving hybrid channel state information in order to support a multiple antenna multi input multi output (MIMO) system.

Technical objects to be achieved by the present invention are not limited to the aforementioned technical objects, and other technical objects not described above may be evidently understood by a person having ordinary skill in the art to which the present invention pertains from the following description.

Technical Solution

In an aspect of the present invention, a method for a UE to transmit channel state information (CSI) in a wireless communication system may include the steps of receiving configuration information for a single CSI process comprising a first channel state information-reference signal (CSI-RS) configuration associated with K CSI-RS resources greater than 1 of a beamformed CSI-RS type and a second CSI-RS configuration associated with one CSI-RS resource of a beamformed CSI-RS type from an eNB, reporting an indicator indicating a CSI-RS resource selected from the K CSI-RS resources to the eNB, and reporting a channel quality indicator (CQI)/precoding matrix indicator (PMI)/rank indicator (RI) derived based on the one CSI-RS resource to the eNB.

In another aspect of the present invention, a UE transmitting channel state information (CSI) in a wireless communication system includes a radio frequency (RF) unit for transmitting or receiving a radio signal and a processor controlling the RF unit, wherein the processor may be configured to receive configuration information for a single CSI process comprising a first channel state information-reference signal (CSI-RS) configuration associated with K CSI-RS resources greater than 1 of a beamformed CSI-RS type and a second CSI-RS configuration associated with one CSI-RS resource of a beamformed CSI-RS type from an eNB, report an indicator indicating a CSI-RS resource selected from the K CSI-RS resources to the eNB; and report a channel quality indicator (CQI)/precoding matrix indicator (PMI)/rank indicator (RI) derived based on the one CSI-RS resource to the eNB.

Preferably, the one CSI-RS resource may be determined as a CSI-RS resource to which a highest or lowest index has been assigned among the K CSI-RS resources.

Preferably, the CQI/PMI/RI may be calculated independently of the first CSI-RS configuration.

Preferably, when an aperiodic CSI report is triggered, the indicator and the CQI/PMI/RI may be together reported to the eNB.

Preferably, when an aperiodic CSI report is triggered, only one of the indicator and the CQI/PMI/RI may be reported to the eNB.

Preferably, when the aperiodic CSI report is triggered, which one of the indicator and the CQI/PMI/RI has to be reported may be indicated.

Preferably, in the periodic CSI report, the indicator may be reported at an indicator report occasion, and the CQI/PMI/RI may be reported at a CSI report occasion other than the indicator report occasion.

Preferably, measurement restrictions may be individually applied to the first CSI-RS configuration and the second CSI-RS configuration.

Preferably, a measurement restriction may be applied to the first CSI-RS configuration and the second CSI-RS configuration in common.

Advantageous Effects

In accordance with an embodiment of the present invention, signaling overhead for reporting channel state information can be reduced by defining hybrid channel state information.

Furthermore, in accordance with an embodiment of the present invention, more channel state information processes can be configured in a UE by defining hybrid channel state information.

Furthermore, in accordance with an embodiment of the present invention, the number of transmission points that serves a UE can be maximized by defining hybrid channel state information.

Effects which may be obtained by the present invention are not limited to the aforementioned effects, and other technical effects not described above may be evidently understood by a person having ordinary skill in the art to which the present invention pertains from the following description.

DESCRIPTION OF DRAWINGS

The accompanying drawings, which are included herein as a part of the description for help understanding the present invention, provide embodiments of the present invention, and describe the technical features of the present invention with the description below.

FIG. 1 illustrates the structure of a radio frame in a wireless communication system to which the present invention may be applied.

FIG. 2 is a diagram illustrating a resource grid for a downlink slot in a wireless communication system to which the present invention may be applied.

FIG. 3 illustrates a structure of downlink subframe in a wireless communication system to which the present invention may be applied.

FIG. 4 illustrates a structure of uplink subframe in a wireless communication system to which the present invention may be applied.

FIG. 5 shows the configuration of a known MIMO communication system.

FIG. 6 is a diagram showing a channel from a plurality of transmission antennas to a single reception antenna.

FIG. 7 illustrates reference signal patterns mapped to downlink resource block pairs in a wireless communication system to which the present invention may be applied.

FIG. 8 is a diagram illustrating resources to which reference signals are mapped in a wireless communication system to which the present invention may be applied.

FIG. 9 illustrates a 2D-AAS having 64 antenna elements in a wireless communication system to which the present invention may be applied.

FIG. 10 illustrates a system in which an eNB or UE has a plurality of transmission/reception antennas capable of forming a 3D beam based on the AAS in a wireless communication system to which the present invention may be applied.

FIG. 11 illustrates a 2D antenna system having cross-polarizations in a wireless communication system to which the present invention may be applied.

FIG. 12 illustrates a transceiver unit model in a wireless communication system to which the present invention may be applied.

FIG. 13 is a diagram illustrating a method of transmitting or receiving channel state information according to an embodiment of the present invention.

FIG. 14 illustrates a block diagram of a wireless communication apparatus according to an embodiment of the present invention.

MODE FOR INVENTION

Some embodiments of the present invention are described in detail with reference to the accompanying drawings. A detailed description to be disclosed along with the accompanying drawings are intended to describe some embodiments of the present invention and are not intended to describe a sole embodiment of the present invention. The following detailed description includes more details in order to provide full understanding of the present invention. However, those skilled in the art will understand that the present invention may be implemented without such more details.

In some cases, in order to avoid that the concept of the present invention becomes vague, known structures and devices are omitted or may be shown in a block diagram form based on the core functions of each structure and device.

In this specification, a base station has the meaning of a terminal node of a network over which the base station directly communicates with a device. In this document, a specific operation that is described to be performed by a base station may be performed by an upper node of the base station according to circumstances. That is, it is evident that in a network including a plurality of network nodes including a base station, various operations performed for communication with a device may be performed by the base station or other network nodes other than the base station. The base station (BS) may be substituted with another term, such as a fixed station, a Node B, an eNB (evolved-NodeB), a Base Transceiver System (BTS), or an access point (AP). Furthermore, the device may be fixed or may have mobility and may be substituted with another term, such as User Equipment (UE), a Mobile Station (MS), a User Terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, or a Device-to-Device (D2D) device.

Hereinafter, downlink (DL) means communication from an eNB to UE, and uplink (UL) means communication from UE to an eNB. In DL, a transmitter may be part of an eNB, and a receiver may be part of UE. In UL, a transmitter may be part of UE, and a receiver may be part of an eNB.

Specific terms used in the following description have been provided to help understanding of the present invention, and the use of such specific terms may be changed in various forms without departing from the technical sprit of the present invention.

The following technologies may be used in a variety of wireless communication systems, such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), and Non-Orthogonal Multiple Access (NOMA). CDMA may be implemented using a radio technology, such as Universal Terrestrial Radio Access (UTRA) or CDMA2000. TDMA may be implemented using a radio technology, such as Global System for Mobile communications (GSM)/General Packet Radio Service (GPRS)/Enhanced Data rates for GSM Evolution (EDGE). OFDMA may be implemented using a radio technology, such as Institute of Electrical and Electronics Engineers (IEEE) 802.11 (Wi-Fi), IEEE 802.16 (WiMAX), IEEE 802.20, or Evolved UTRA (E-UTRA). UTRA is part of a Universal Mobile Telecommunications System (UMTS). 3rd Generation Partnership Project (3GPP) Long Term Evolution (LTE) is part of an Evolved UMTS (E-UMTS) using evolved UMTS Terrestrial Radio Access (E-UTRA), and it adopts OFDMA in downlink and adopts SC-FDMA in uplink. LTE-Advanced (LTE-A) is the evolution of 3GPP LTE.

Embodiments of the present invention may be supported by the standard documents disclosed in at least one of IEEE 802, 3GPP, and 3GPP2, that is, radio access systems. That is, steps or portions that belong to the embodiments of the present invention and that are not described in order to clearly expose the technical spirit of the present invention may be supported by the documents. Furthermore, all terms disclosed in this document may be described by the standard documents.

In order to more clarify a description, 3GPP LTE/LTE-A is chiefly described, but the technical characteristics of the present invention are not limited thereto.

General System to which the Present Invention May be Applied

FIG. 1 shows the structure of a radio frame in a wireless communication system to which an embodiment of the present invention may be applied.

3GPP LTE/LTE-A support a radio frame structure type 1 which may be applicable to Frequency Division Duplex (FDD) and a radio frame structure which may be applicable to Time Division Duplex (TDD).

The size of a radio frame in the time domain is represented as a multiple of a time unit of $T\_s=1/(15000*2048)$. A UL and DL transmission includes the radio frame having a duration of $T\_f=307200*T\_s=10$ ms.

FIG. 1(a) exemplifies a radio frame structure type 1. The type 1 radio frame may be applied to both of full duplex FDD and half duplex FDD.

A radio frame includes 10 subframes. A radio frame includes 20 slots of $T\_slot=15360*T\_s=0.5$ ms length, and 0 to 19 indexes are given to each of the slots. One subframe includes consecutive two slots in the time domain, and subframe i includes slot 2i and slot 2i+1. The time required for transmitting a subframe is referred to as a transmission time interval (TTI). For example, the length of the subframe i may be 1 ms and the length of a slot may be 0.5 ms.

A UL transmission and a DL transmission I the FDD are distinguished in the frequency domain. Whereas there is no restriction in the full duplex FDD, a UE may not transmit and receive simultaneously in the half duplex FDD operation.

One slot includes a plurality of Orthogonal Frequency Division Multiplexing (OFDM) symbols in the time domain and includes a plurality of Resource Blocks (RBs) in a frequency domain. In 3GPP LTE, OFDM symbols are used to represent one symbol period because OFDMA is used in downlink. An OFDM symbol may be called one SC-FDMA symbol or symbol period. An RB is a resource allocation unit and includes a plurality of contiguous subcarriers in one slot.

FIG. 1(b) shows frame structure type 2.

A type 2 radio frame includes two half frame of $153600*T\_s=5$ ms length each. Each half frame includes 5 subframes of $30720*T\_s=1$ ms length.

In the frame structure type 2 of a TDD system, an uplink-downlink configuration is a rule indicating whether uplink and downlink are allocated (or reserved) to all subframes.

Table 1 shows the uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |

TABLE 1-continued

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, in each subframe of the radio frame, 'D' represents a subframe for a DL transmission, 'U' represents a subframe for UL transmission, and 'S' represents a special subframe including three types of fields including a Downlink Pilot Time Slot (DwPTS), a Guard Period (GP), and a Uplink Pilot Time Slot (UpPTS).

A DwPTS is used for an initial cell search, synchronization or channel estimation in a UE. A UpPTS is used for channel estimation in an eNB and for synchronizing a UL transmission synchronization of a UE. A GP is duration for removing interference occurred in a UL owing to multi-path delay of a DL signal between a UL and a DL.

Each subframe i includes slot 2i and slot 2i+1 of $T\_slot=15360*T\_s=0.5$ ms.

The UL-DL configuration may be classified into 7 types, and the position and/or the number of a DL subframe, a special subframe and a UL subframe are different for each configuration.

A point of time at which a change is performed from downlink to uplink or a point of time at which a change is performed from uplink to downlink is called a switching point. The periodicity of the switching point means a cycle in which an uplink subframe and a downlink subframe are changed is identically repeated. Both 5 ms and 10 ms are supported in the periodicity of a switching point. If the periodicity of a switching point has a cycle of a 5 ms downlink-uplink switching point, the special subframe S is present in each half frame. If the periodicity of a switching point has a cycle of a 5 ms downlink-uplink switching point, the special subframe S is present in the first half frame only.

In all the configurations, 0 and 5 subframes and a DwPTS are used for only downlink transmission. An UpPTS and a subframe subsequent to a subframe are always used for uplink transmission.

Such uplink-downlink configurations may be known to both an eNB and UE as system information. An eNB may notify UE of a change of the uplink-downlink allocation state of a radio frame by transmitting only the index of uplink-downlink configuration information to the UE whenever the uplink-downlink configuration information is changed. Furthermore, configuration information is kind of downlink control information and may be transmitted through a Physical Downlink Control Channel (PDCCH) like other scheduling information. Configuration information may be transmitted to all UEs within a cell through a broadcast channel as broadcasting information.

Table 2 represents configuration (length of DwPTS/GP/UpPTS) of a special subframe.

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

The structure of a radio subframe according to the example of FIG. 1 is just an example, and the number of subcarriers included in a radio frame, the number of slots included in a subframe and the number of OFDM symbols included in a slot may be changed in various manners.

FIG. 2 is a diagram illustrating a resource grid for one downlink slot in a wireless communication system to which an embodiment of the present invention may be applied.

Referring to FIG. 2, one downlink slot includes a plurality of OFDM symbols in a time domain. It is described herein that one downlink slot includes 7 OFDMA symbols and one resource block includes 12 subcarriers for exemplary purposes only, and the present invention is not limited thereto.

Each element on the resource grid is referred to as a resource element, and one resource block (RB) includes 12×7 resource elements. The number of RBs N^DL included in a downlink slot depends on a downlink transmission bandwidth.

The structure of an uplink slot may be the same as that of a downlink slot.

FIG. 3 shows the structure of a downlink subframe in a wireless communication system to which an embodiment of the present invention may be applied.

Referring to FIG. 3, a maximum of three OFDM symbols located in a front portion of a first slot of a subframe correspond to a control region in which control channels are allocated, and the remaining OFDM symbols correspond to a data region in which a physical downlink shared channel (PDSCH) is allocated. Downlink control channels used in 3GPP LTE include, for example, a physical control format indicator channel (PCFICH), a physical downlink control channel (PDCCH), and a physical hybrid-ARQ indicator channel (PHICH).

A PCFICH is transmitted in the first OFDM symbol of a subframe and carries information about the number of OFDM symbols (i.e., the size of a control region) which is used to transmit control channels within the subframe. A PHICH is a response channel for uplink and carries an acknowledgement (ACK)/not-acknowledgement (NACK) signal for a Hybrid Automatic Repeat Request (HARQ). Control information transmitted in a PDCCH is called Downlink Control Information (DCI). DCI includes uplink resource allocation information, downlink resource allocation information, or an uplink transmission (Tx) power control command for a specific UE group.

A PDCCH may carry information about the resource allocation and transport format of a downlink shared channel (DL-SCH) (this is also called an "downlink grant"), resource allocation information about an uplink shared channel (UL-SCH) (this is also called a "uplink grant"), paging information on a PCH, system information on a DL-SCH, the resource allocation of a higher layer control message, such as a random access response transmitted on a PDSCH, a set of transmission power control commands for individual UE within specific UE group, and the activation of a Voice over Internet Protocol (VoIP), etc. A plurality of PDCCHs may be transmitted within the control region, and UE may monitor a plurality of PDCCHs. A PDCCH is transmitted on a single Control Channel Element (CCE) or an aggregation of some contiguous CCEs. A CCE is a logical allocation unit that is used to provide a PDCCH with a coding rate according to the state of a radio channel. A CCE corresponds to a plurality of resource element groups. The format of a PDCCH and the number of available bits of a PDCCH are determined by an association relationship between the number of CCEs and a coding rate provided by CCEs.

An eNB determines the format of a PDCCH based on DCI to be transmitted to UE and attaches a Cyclic Redundancy Check (CRC) to control information. A unique identifier (a Radio Network Temporary Identifier (RNTI)) is masked to the CRC depending on the owner or use of a PDCCH. If the PDCCH is a PDCCH for specific UE, an identifier unique to the UE, for example, a Cell-RNTI (C-RNTI) may be masked to the CRC. If the PDCCH is a PDCCH for a paging message, a paging indication identifier, for example, a Paging-RNTI (P-RNTI) may be masked to the CRC. If the PDCCH is a PDCCH for system information, more specifically, a System Information Block (SIB), a system information identifier, for example, a System Information-RNTI (SI-RNTI) may be masked to the CRC. A Random Access-RNTI (RA-RNTI) may be masked to the CRC in order to indicate a random access response which is a response to the transmission of a random access preamble by UE.

FIG. 4 shows the structure of an uplink subframe in a wireless communication system to which an embodiment of the present invention may be applied.

Referring to FIG. 4, the uplink subframe may be divided into a control region and a data region in a frequency domain. A physical uplink control channel (PUCCH) carrying uplink control information is allocated to the control region. A physical uplink shared channel (PUSCH) carrying user data is allocated to the data region. In order to maintain single carrier characteristic, one UE does not send a PUCCH and a PUSCH at the same time.

A Resource Block (RB) pair is allocated to a PUCCH for one UE within a subframe. RBs belonging to an RB pair occupy different subcarriers in each of 2 slots. This is called that an RB pair allocated to a PUCCH is frequency-hopped in a slot boundary.

Multi-Input Multi-Output (MIMO)

A MIMO technology does not use single transmission antenna and single reception antenna that have been commonly used so far, but uses a multi-transmission (Tx) antenna and a multi-reception (Rx) antenna. In other words, the MIMO technology is a technology for increasing a capacity or enhancing performance using multi-input/output antennas in the transmission end or reception end of a wireless communication system. Hereinafter, MIMO is called a "multi-input/output antenna.".

More specifically, the multi-input/output antenna technology does not depend on a single antenna path in order to receive a single total message and completes total data by collecting a plurality of data pieces received through several antennas. As a result, the multi-input/output antenna technology can increase a data transfer rate within a specific system range and can also increase a system range through a specific data transfer rate.

It is expected that an efficient multi-input/output antenna technology will be used because next-generation mobile communication requires a data transfer rate much higher than that of existing mobile communication. In such a situation, the MIMO communication technology is a next-generation mobile communication technology which may be widely used in mobile communication UE and a relay node and has been in the spotlight as a technology which may overcome a limit to the transfer rate of another mobile communication attributable to the expansion of data communication.

Meanwhile, the multi-input/output antenna (MIMO) technology of various transmission efficiency improvement technologies that are being developed has been most in the spotlight as a method capable of significantly improving a communication capacity and transmission/reception performance even without the allocation of additional frequencies or a power increase.

FIG. 5 shows the configuration of a known MIMO communication system.

Referring to FIG. 5, if the number of transmission (Tx) antennas is increased to N_T and the number of reception (Rx) antennas is increased to N_R at the same time, a theoretical channel transmission capacity is increased in proportion to the number of antennas, unlike in the case where a plurality of antennas is used only in a transmitter or a receiver. Accordingly, a transfer rate can be improved, and frequency efficiency can be significantly improved. In this case, a transfer rate according to an increase of a channel transmission capacity may be theoretically increased by a value obtained by multiplying the following rate increment R_i by a maximum transfer rate R_o if one antenna is used.

$$R_i = \min(N_T, N_R) \quad \text{[Equation 1]}$$

That is, in an MIMO communication system using 4 transmission antennas and 4 reception antennas, for example, a quadruple transfer rate can be obtained theoretically compared to a single antenna system.

Such a multi-input/output antenna technology may be divided into a spatial diversity method for increasing transmission reliability using symbols passing through various channel paths and a spatial multiplexing method for improving a transfer rate by sending a plurality of data symbols at the same time using a plurality of transmission antennas. Furthermore, active research is being recently carried out on a method for properly obtaining the advantages of the two methods by combining the two methods.

Each of the methods is described in more detail below.

First, the spatial diversity method includes a space-time block code-series method and a space-time Trelis code-series method using a diversity gain and a coding gain at the same time. In general, the Trelis code-series method is better in terms of bit error rate improvement performance and the degree of a code generation freedom, whereas the space-time block code-series method has low operational complexity. Such a spatial diversity gain may correspond to an amount corresponding to the product (N_T×N_R) of the number of transmission antennas (N_T) and the number of reception antennas (N_R).

Second, the spatial multiplexing scheme is a method for sending different data streams in transmission antennas. In this case, in a receiver, mutual interference is generated between data transmitted by a transmitter at the same time. The receiver removes the interference using a proper signal processing scheme and receives the data. A noise removal method used in this case may include a Maximum Likelihood Detection (MLD) receiver, a Zero-Forcing (ZF) receiver, a Minimum Mean Square Error (MMSE) receiver, Diagonal-Bell Laboratories Layered Space-Time (D-BLAST), and Vertical-Bell Laboratories Layered Space-Time (V-BLAST). In particular, if a transmission end can be aware of channel information, a Singular Value Decomposition (SVD) method may be used.

Third, there is a method using a combination of a spatial diversity and spatial multiplexing. If only a spatial diversity gain is to be obtained, a performance improvement gain according to an increase of a diversity disparity is gradually saturated. If only a spatial multiplexing gain is used, transmission reliability in a radio channel is deteriorated. Methods for solving the problems and obtaining the two gains have been researched and may include a double space-time transmit diversity (double-STTD) method and a space-time bit interleaved coded modulation (STBICM).

In order to describe a communication method in a multi-input/output antenna system, such as that described above, in more detail, the communication method may be represented as follows through mathematical modeling.

First, as shown in FIG. 5, it is assumed that N_T transmission antennas and NR reception antennas are present.

First, a transmission signal is described below. If the N_T transmission antennas are present as described above, a maximum number of pieces of information which can be transmitted are N_T, which may be represented using the following vector.

$$s = [s_1, s_2, \Lambda, s_{N_T}]^T \quad \text{[Equation 2]}$$

Meanwhile, transmission power may be different in each of pieces of transmission information s_1, s_2, ..., s_NT. In this case, if pieces of transmission power are P_1, P_2, ..., P_NT, transmission information having controlled transmission power may be represented using the following vector.

$$\hat{s} = [\hat{s}_1, \hat{s}_2, \Lambda, \hat{s}_{N_T}]^T = [P_1 s_1, P_2 s_2, \Lambda, P_{N_T} s_N^T]^T \quad \text{[Equation 3]}$$

Furthermore, transmission information having controlled transmission power in the Equation 3 may be represented as follows using the diagonal matrix P of transmission power.

$$\hat{s} = \begin{bmatrix} P_1 & & & 0 \\ & P_2 & & \\ & & O & \\ 0 & & & P_{N_T} \end{bmatrix} \begin{bmatrix} s_1 \\ s_2 \\ M \\ s_{N_T} \end{bmatrix} = Ps \quad \text{[Equation 4]}$$

Meanwhile, the information vector having controlled transmission power in the Equation 4 is multiplied by a weight matrix W, thus forming N_T transmission signals x_1, x_2, . . . , x_NT that are actually transmitted. In this case, the weight matrix functions to properly distribute the transmission information to antennas according to a transport channel condition. The following may be represented using the transmission signals x_1, x_2, . . . , x_NT.

$$x = \begin{bmatrix} x_1 \\ x_2 \\ M \\ x_i \\ M \\ x_{N_T} \end{bmatrix} = \begin{bmatrix} w_{11} & w_{12} & \Lambda & w_{1N_T} \\ w_{21} & w_{22} & \Lambda & w_{2N_T} \\ M & & O & \\ w_{i1} & w_{i2} & \Lambda & w_{iN_T} \\ M & & O & \\ w_{N_T 1} & w_{N_T 2} & \Lambda & w_{N_T N_T} \end{bmatrix} \begin{bmatrix} \hat{s}_1 \\ \hat{s}_2 \\ M \\ \hat{s}_j \\ M \\ \hat{s}_{N_T} \end{bmatrix} =$$ [Equation 5]

$$W\hat{s} = WPs$$

In this case, w_ij denotes weight between an i-th transmission antenna and a j-th transmission information, and W is an expression of a matrix of the weight. Such a matrix W is called a weight matrix or precoding matrix.

Meanwhile, the transmission signal x, such as that described above, may be considered to be used in a case where a spatial diversity is used and a case where spatial multiplexing is used.

If spatial multiplexing is used, all the elements of the information vector s have different values because different signals are multiplexed and transmitted. In contrast, if the spatial diversity is used, all the elements of the information vector s have the same value because the same signals are transmitted through several channel paths.

A method of mixing spatial multiplexing and the spatial diversity may be taken into consideration. In other words, the same signals may be transmitted using the spatial diversity through 3 transmission antennas, for example, and the remaining different signals may be spatially multiplexed and transmitted.

If N_R reception antennas are present, the reception signals y_1, y_2, . . . , y_NR of the respective antennas are represented as follows using a vector y.

$$y = [y_1, y_2, \Lambda, y_{N_R}]^T$$ [Equation 6]

Meanwhile, if channels in a multi-input/output antenna communication system are modeled, the channels may be classified according to transmission/reception antenna indices. A channel passing through a reception antenna i from a transmission antenna j is represented as h_ij. In this case, it is to be noted that in order of the index of h_ij, the index of a reception antenna comes first and the index of a transmission antenna then comes.

Several channels may be grouped and expressed in a vector and matrix form. For example, a vector expression is described below.

FIG. 6 is a diagram showing a channel from a plurality of transmission antennas to a single reception antenna.

As shown in FIG. 6, a channel from a total of N_T transmission antennas to a reception antenna i may be represented as follows.

$$h_i^T = [h_{i1}, h_{i2}, \Lambda, h_{iN_T}]$$ [Equation 7]

Furthermore, if all channels from the N_T transmission antenna to NR reception antennas are represented through a matrix expression, such as Equation 7, they may be represented as follows.

$$H = \begin{bmatrix} h_1^T \\ h_2^T \\ M \\ h_i^T \\ M \\ h_{N_R}^T \end{bmatrix} = \begin{bmatrix} h_{11} & h_{12} & \Lambda & h_{1N_T} \\ h_{21} & h_{22} & \Lambda & h_{2N_T} \\ M & & O & \\ h_{i1} & h_{i2} & \Lambda & h_{iN_T} \\ M & & O & \\ h_{N_R 1} & h_{N_R 2} & \Lambda & h_{N_R N_T} \end{bmatrix}$$ [Equation 8]

Meanwhile, Additive White Gaussian Noise (AWGN) is added to an actual channel after the actual channel experiences the channel matrix H. Accordingly, AWGN n_1, n_2, . . . , n_NR added to the N_R reception antennas, respectively, are represented using a vector as follows.

$$n = [n_1, n_2, \Lambda, n_{N_R}]^T$$ [Equation 9]

A transmission signal, a reception signal, a channel, and AWGN in a multi-input/output antenna communication system may be represented to have the following relationship through the modeling of the transmission signal, reception signal, channel, and AWGN, such as those described above.

$$y = \begin{bmatrix} y_1 \\ y_2 \\ M \\ y_i \\ M \\ y_{N_R} \end{bmatrix} = \begin{bmatrix} h_{11} & h_{12} & \Lambda & h_{1N_T} \\ h_{21} & h_{22} & \Lambda & h_{2N_T} \\ M & & O & \\ h_{i1} & h_{i2} & \Lambda & h_{iN_T} \\ M & & O & \\ h_{N_R 1} & h_{N_R 2} & \Lambda & h_{N_R N_T} \end{bmatrix} \begin{bmatrix} x_1 \\ x_2 \\ M \\ x_j \\ M \\ x_{N_T} \end{bmatrix} + \begin{bmatrix} n_1 \\ n_2 \\ M \\ n_i \\ M \\ n_{N_R} \end{bmatrix} =$$ [Equation 10]

$$Hx + n$$

Meanwhile, the number of rows and columns of the channel matrix H indicative of the state of channels is determined by the number of transmission/reception antennas. In the channel matrix H, as described above, the number of rows becomes equal to the number of reception antennas N_R, and the number of columns becomes equal to the number of transmission antennas N_T. That is, the channel matrix H becomes an N_R×N_T matrix.

In general, the rank of a matrix is defined as a minimum number of the number of independent rows or columns. Accordingly, the rank of the matrix is not greater than the number of rows or columns. As for figural style, for example, the rank H of the channel matrix H is limited as follows.

$$\operatorname{rank}(H) \leq \min(N_T, N_R)$$ [Equation 11]

Furthermore, if a matrix is subjected to Eigen value decomposition, a rank may be defined as the number of Eigen values that belong to Eigen values and that are not 0. Likewise, if a rank is subjected to Singular Value Decomposition (SVD), it may be defined as the number of singular values other than 0. Accordingly, the physical meaning of a rank in a channel matrix may be said to be a maximum number on which different information may be transmitted in a given channel.

In this specification, a "rank" for MIMO transmission indicates the number of paths through which signals may be independently transmitted at a specific point of time and a specific frequency resource. The "number of layers" indicates the number of signal streams transmitted through each path. In general, a rank has the same meaning as the number of layers unless otherwise described because a transmission end sends the number of layers corresponding to the number of ranks used in signal transmission.

Reference Signal (RS)

In a wireless communication system, a signal may be distorted during transmission because data is transmitted through a radio channel. In order for a reception end to accurately receive a distorted signal, the distortion of a received signal needs to be corrected using channel information. In order to detect channel information, a method of detecting channel information using the degree of the distortion of a signal transmission method and a signal known to both the transmission side and the reception side when they are transmitted through a channel is chiefly used. The aforementioned signal is called a pilot signal or reference signal (RS).

Furthermore recently, when most of mobile communication systems transmit a packet, they use a method capable of improving transmission/reception data efficiency by adopting multiple transmission antennas and multiple reception antennas instead of using one transmission antenna and one reception antenna used so far. When data is transmitted and received using multiple input/output antennas, a channel state between the transmission antenna and the reception antenna must be detected in order to accurately receive the signal. Accordingly, each transmission antenna must have an individual reference signal.

In a mobile communication system, an RS may be basically divided into two types depending on its object. There are an RS having an object of obtaining channel state information and an RS used for data demodulation. The former has an object of obtaining, by a UE, to obtain channel state information in the downlink. Accordingly, a corresponding RS must be transmitted in a wideband, and a UE must be capable of receiving and measuring the RS although the UE does not receive downlink data in a specific subframe. Furthermore, the former is also used for radio resources management (RRM) measurement, such as handover. The latter is an RS transmitted along with corresponding resources when an eNB transmits the downlink. A UE may perform channel estimation by receiving a corresponding RS and thus may demodulate data. The corresponding RS must be transmitted in a region in which data is transmitted.

A downlink RS includes one common RS (CRS) for the acquisition of information about a channel state shared by all of UEs within a cell and measurement, such as handover, and a dedicated RS (DRS) used for data demodulation for only a specific UE. Information for demodulation and channel measurement can be provided using such RSs. That is, the DRS is used for only data demodulation, and the CRS is used for the two objects of channel information acquisition and data demodulation.

The reception side (i.e., UE) measures a channel state based on a CRS and feeds an indicator related to channel quality, such as a channel quality indicator (CQI), a precoding matrix index (PMI) and/or a rank indicator (RI), back to the transmission side (i.e., an eNB). The CRS is also called a cell-specific RS. In contrast, a reference signal related to the feedback of channel state information (CSI) may be defined as a CSI-RS.

The DRS may be transmitted through resource elements if data on a PDSCH needs to be demodulated. A UE may receive information about whether a DRS is present through a higher layer, and the DRS is valid only if a corresponding PDSCH has been mapped. The DRS may also be called a UE-specific RS or demodulation RS (DMRS).

FIG. 7 illustrates reference signal patterns mapped to downlink resource block pairs in a wireless communication system to which the present invention may be applied.

Referring to FIG. 7, a downlink resource block pair, that is, a unit in which a reference signal is mapped, may be represented in the form of one subframe in a time domain X 12 subcarriers in a frequency domain. That is, in a time axis (an x axis), one resource block pair has a length of 14 OFDM symbols in the case of a normal cyclic prefix (CP) (FIG. 7a) and has a length of 12 OFDM symbols in the case of an extended cyclic prefix (CP) (FIG. 7b). In the resource block lattice, resource elements (REs) indicated by "0", "1", "2", and "3" mean the locations of the CRSs of antenna port indices "0", "1", "2", and "3", respectively, and REs indicated by "D" mean the location of a DRS.

A CRS is described in more detail below. The CRS is a reference signal which is used to estimate the channel of a physical antenna and may be received by all UEs located within a cell in common. The CRS is distributed to a full frequency bandwidth. That is, the CRS is cell-specific signal and is transmitted every subframe in a wideband. Furthermore, the CRS may be used for channel quality information (CSI) and data demodulation.

A CRS is defined in various formats depending on an antenna array on the transmitting side (eNB). In the 3GPP LTE system (e.g., Release-8), an RS for a maximum four antenna ports is transmitted depending on the number of transmission antennas of an eNB. The side from which a downlink signal is transmitted has three types of antenna arrays, such as a single transmission antenna, two transmission antennas and four transmission antennas. For example, if the number of transmission antennas of an eNB is two, CRSs for a No. 0 antenna port and a No. 1 antenna port are transmitted. If the number of transmission antennas of an eNB is four, CRSs for No. 0~No. 3 antenna ports are transmitted. If the number of transmission antennas of an eNB is four, a CRS pattern in one RB is shown in FIG. 7.

If an eNB uses a single transmission antenna, reference signals for a single antenna port are arrayed.

If an eNB uses two transmission antennas, reference signals for two transmission antenna ports are arrayed using a time division multiplexing (TDM) scheme and/or a frequency division multiplexing (FDM) scheme. That is, different time resources and/or different frequency resources are allocated in order to distinguish between reference signals for two antenna ports.

Furthermore, if an eNB uses four transmission antennas, reference signals for four transmission antenna ports are arrayed using the TDM and/or FDM schemes. Channel information measured by the reception side (i.e., UE) of a downlink signal may be used to demodulate data transmitted using a transmission scheme, such as single transmission antenna transmission, transmission diversity, closed-loop spatial multiplexing, open-loop spatial multiplexing or a multi-user-multi-input/output (MIMO) antenna.

If a multi-input multi-output antenna is supported, when a RS is transmitted by a specific antenna port, the RS is transmitted in the locations of resource elements specified depending on a pattern of the RS and is not transmitted in the locations of resource elements specified for other antenna ports. That is, RSs between different antennas do not overlap.

A DRS is described in more detail below. The DRS is used to demodulate data. In multi-input multi-output antenna transmission, precoding weight used for a specific UE is combined with a transmission channel transmitted by each transmission antenna when the UE receives an RS, and is used to estimate a corresponding channel without any change.

A 3GPP LTE system (e.g., Release-8) supports a maximum of four transmission antennas, and a DRS for rank 1 beamforming is defined. The DRS for rank 1 beamforming also indicates an RS for an antenna port index 5.

In an LTE-A system, that is, an advanced and developed form of the LTE system, the design is necessary to support a maximum of eight transmission antennas in the downlink of an eNB. Accordingly, RSs for the maximum of eight transmission antennas must be also supported. In the LTE system, only downlink RSs for a maximum of four antenna ports has been defined. Accordingly, if an eNB has four to a maximum of eight downlink transmission antennas in the LTE-A system, RSs for these antenna ports must be additionally defined and designed. Regarding the RSs for the maximum of eight transmission antenna ports, the aforementioned RS for channel measurement and the aforementioned RS for data demodulation must be designed.

One of important factors that must be considered in designing an LTE-A system is backward compatibility, that is, that an LTE UE must well operate even in the LTE-A system, which must be supported by the system. From an RS transmission viewpoint, in the time-frequency domain in which a CRS defined in LTE is transmitted in a full band every subframe, RSs for a maximum of eight transmission antenna ports must be additionally defined. In the LTE-A system, if an RS pattern for a maximum of eight transmission antennas is added in a full band every subframe using the same method as the CRS of the existing LTE, RS overhead is excessively increased.

Accordingly, the RS newly designed in the LTE-A system is basically divided into two types, which include an RS having a channel measurement object for the selection of MCS or a PMI (channel state information-RS or channel state indication-RS (CSI-RS)) and an RS for the demodulation of data transmitted through eight transmission antennas (data demodulation-RS (DM-RS)).

The CSI-RS for the channel measurement object is characterized in that it is designed for an object focused on channel measurement unlike the existing CRS used for objects for measurement, such as channel measurement and handover, and for data demodulation. Furthermore, the CSI-RS may also be used for an object for measurement, such as handover. The CSI-RS does not need to be transmitted every subframe unlike the CRS because it is transmitted for an object of obtaining information about a channel state. In order to reduce overhead of a CSI-RS, the CSI-RS is intermittently transmitted on the time axis.

For data demodulation, a DM-RS is dedicatedly transmitted to a UE scheduled in a corresponding time-frequency domain. That is, a DM-RS for a specific UE is transmitted only in a region in which the corresponding UE has been scheduled, that is, in the time-frequency domain in which data is received.

In the LTE-A system, a maximum of eight transmission antennas are supported in the downlink of an eNB. In the LTE-A system, if RSs for a maximum of eight transmission antennas are transmitted in a full band every subframe using the same method as the CRS in the existing LTE, RS overhead is excessively increased. Accordingly, in the LTE-A system, an RS has been separated into the CSI-RS of the CSI measurement object for the selection of MCS or a PMI and the DM-RS for data demodulation, and thus the two RSs have been added. The CSI-RS may also be used for an object, such as RRM measurement, but has been designed for a main object for the acquisition of CSI. The CSI-RS does not need to be transmitted every subframe because it is not used for data demodulation. Accordingly, in order to reduce overhead of the CSI-RS, the CSI-RS is intermittently transmitted on the time axis. That is, the CSI-RS has a period corresponding to a multiple of the integer of one subframe and may be periodically transmitted or transmitted in a specific transmission pattern. In this case, the period or pattern in which the CSI-RS is transmitted may be set by an eNB.

For data demodulation, a DM-RS is dedicatedly transmitted to a UE scheduled in a corresponding time-frequency domain. That is, a DM-RS for a specific UE is transmitted only in the region in which scheduling is performed for the corresponding UE, that is, only in the time-frequency domain in which data is received.

In order to measure a CSI-RS, a UE must be aware of information about the transmission subframe index of the CSI-RS for each CSI-RS antenna port of a cell to which the UE belongs, the location of a CSI-RS resource element (RE) time-frequency within a transmission subframe, and a CSI-RS sequence.

In the LTE-A system, an eNB has to transmit a CSI-RS for each of a maximum of eight antenna ports. Resources used for the CSI-RS transmission of different antenna ports must be orthogonal. When one eNB transmits CSI-RSs for different antenna ports, it may orthogonally allocate the resources according to the FDM/TDM scheme by mapping the CSI-RSs for the respective antenna ports to different REs. Alternatively, the CSI-RSs for different antenna ports may be transmitted according to the CDM scheme for mapping the CSI-RSs to pieces of code orthogonal to each other.

When an eNB notifies a UE belonging to the eNB of information on a CSI-RS, first, the eNB must notify the UE of information about a time-frequency in which a CSI-RS for each antenna port is mapped. Specifically, the information includes subframe numbers in which the CSI-RS is transmitted or a period in which the CSI-RS is transmitted, a subframe offset in which the CSI-RS is transmitted, an OFDM symbol number in which the CSI-RS RE of a specific antenna is transmitted, frequency spacing, and the offset or shift value of an RE in the frequency axis.

A CSI-RS is transmitted through one, two, four or eight antenna ports. Antenna ports used in this case are p=15, p=15, 16, p=15, . . . , 18, and p=15, . . . , 22, respectively. A CSI-RS may be defined for only a subcarrier interval Δf=15 kHz.

In a subframe configured for CSI-RS transmission, a CSI-RS sequence is mapped to a complex-valued modulation symbol a_k,l^(p) used as a reference symbol on each antenna port p as in Equation 12.

[Equation 12]

$$a_{k,l}^{(p)} = w_{l''} \cdot r_{l,n_s}(m')$$

$$k = k' + 12m + \begin{cases} -0 & \text{for } p \in \{15, 16\}, \text{ normal cyclic prefix} \\ -6 & \text{for } p \in \{17, 18\}, \text{ normal cyclic prefix} \\ -1 & \text{for } p \in \{19, 20\}, \text{ normal cyclic prefix} \\ -7 & \text{for } p \in \{21, 22\}, \text{ normal cyclic prefix} \\ -0 & \text{for } p \in \{15, 16\}, \text{ extended cyclic prefix} \\ -3 & \text{for } p \in \{17, 18\}, \text{ extended cyclic prefix} \\ -6 & \text{for } p \in \{19, 20\}, \text{ extended cyclic prefix} \\ -9 & \text{for } p \in \{21, 22\}, \text{ extended cyclic prefix} \end{cases}$$

-continued $$l = l' + \begin{cases} l'' & \text{CSI reference signal configurations 0-19,} \\ & \text{normal cyclic prefix} \\ 2l'' & \text{CSI reference signal configurations 20-31,} \\ & \text{normal cyclic prefix} \\ l'' & \text{CSI reference signal configurations 0-27,} \\ & \text{extended cyclic prefix} \end{cases}$$

$$w_{l''} = \begin{cases} 1 & p \in \{15, 17, 19, 21\} \\ (-1)^{l''} & p \in \{16, 18, 20, 22\} \end{cases}$$

$$l'' = 0, 1$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

In Equation 12, (k',l') (wherein k' is a subcarrier index within a resource block and l' indicates an OFDM symbol index within a slot.) and the condition of n_s is determined depending on a CSI-RS configuration, such as Table 3 or Table 4.

Table 3 illustrates the mapping of (k',l') from a CSI-RS configuration in a normal CP.

TABLE 3

| CSI reference signal configuration | | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Frame structure type 1 and 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| Frame structure type 2 only | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

Table 4 illustrates the mapping of (k',l') from a CSI-RS configuration in an extended CP.

TABLE 4

| CSI reference signal configuration | | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Frame structure type 1 and 2 | 0 | (11, 4) | 0 | (11, 4) | 0 | (11, 4) | 0 |
| | 1 | (9, 4) | 0 | (9, 4) | 0 | (9, 4) | 0 |
| | 2 | (10, 4) | 1 | (10, 4) | 1 | (10, 4) | 1 |
| | 3 | (9, 4) | 1 | (9, 4) | 1 | (9, 4) | 1 |
| | 4 | (5, 4) | 0 | (5, 4) | 0 | | |
| | 5 | (3, 4) | 0 | (3, 4) | 0 | | |
| | 6 | (4, 4) | 1 | (4, 4) | 1 | | |
| | 7 | (3, 4) | 1 | (3, 4) | 1 | | |

TABLE 4-continued

| | CSI reference signal configuration | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| | 8 | (8, 4) | 0 | | | | |
| | 9 | (6, 4) | 0 | | | | |
| | 10 | (2, 4) | 0 | | | | |
| | 11 | (0, 4) | 0 | | | | |
| | 12 | (7, 4) | 1 | | | | |
| | 13 | (6, 4) | 1 | | | | |
| | 14 | (1, 4) | 1 | | | | |
| | 15 | (0, 4) | 1 | | | | |
| Frame structure type 2 only | 16 | (11, 1) | 1 | (11, 1) | 1 | (11, 1) | 1 |
| | 17 | (10, 1) | 1 | (10, 1) | 1 | (10, 1) | 1 |
| | 18 | (9, 1) | 1 | (9, 1) | 1 | (9, 1) | 1 |
| | 19 | (5, 1) | 1 | (5, 1) | 1 | | |
| | 20 | (4, 1) | 1 | (4, 1) | 1 | | |
| | 21 | (3, 1) | 1 | (3, 1) | 1 | | |
| | 22 | (8, 1) | 1 | | | | |
| | 23 | (7, 1) | 1 | | | | |
| | 24 | (6, 1) | 1 | | | | |
| | 25 | (2, 1) | 1 | | | | |
| | 26 | (1, 1) | 1 | | | | |
| | 27 | (0, 1) | 1 | | | | |

Referring to Table 3 and Table 4, in the transmission of a CSI-RS, in order to reduce inter-cell interference (ICI) in a multi-cell environment including a heterogeneous network (HetNet) environment, a maximum of 32 different configurations (in the case of a normal CP) or a maximum of 28 different configurations (in the case of an extended CP) are defined.

The CSI-RS configuration is different depending on the number of antenna ports and a CP within a cell, and a neighboring cell may have a maximum of different configurations. Furthermore, the CSI-RS configuration may be divided into a case where it is applied to both an FDD frame and a TDD frame and a case where it is applied to only a TDD frame depending on a frame structure.

(k',l') and n_s are determined depending on a CSI-RS configuration based on Table 3 and Table 4, and time-frequency resources used for CSI-RS transmission are determined depending on each CSI-RS antenna port.

FIG. 8 is a diagram illustrating resources to which reference signals are mapped in a wireless communication system to which the present invention may be applied.

FIG. 8(a) shows twenty types of CSI-RS configurations available for CSI-RS transmission by one or two CSI-RS antenna ports, FIG. 8(b) shows ten types of CSI-RS configurations available for four CSI-RS antenna ports, and FIG. 8(c) shows five types of CSI-RS configurations available for eight CSI-RS antenna ports.

As described above, radio resources (i.e., an RE pair) in which a CSI-RS is transmitted are determined depending on each CSI-RS configuration.

If one or two antenna ports are configured for CSI-RS transmission with respect to a specific cell, the CSI-RS is transmitted on radio resources on a configured CSI-RS configuration of the twenty types of CSI-RS configurations shown in FIG. 8(a).

Likewise, when four antenna ports are configured for CSI-RS transmission with respect to a specific cell, a CSI-RS is transmitted on radio resources on a configured CSI-RS configuration of the ten types of CSI-RS configurations shown in FIG. 8(b). Furthermore, when eight antenna ports are configured for CSI-RS transmission with respect to a specific cell, a CSI-RS is transmitted on radio resources on a configured CSI-RS configuration of the five types of CSI-RS configurations shown in FIG. 8(c).

A CSI-RS for each antenna port is subjected to CDM for every two antenna ports (i.e., {15,16}, {17,18}, {19,20} and {21,22}) on the same radio resources and transmitted. For example, in the case of antenna ports 15 and 16, CSI-RS complex symbols for the respective antenna ports 15 and 16 are the same, but are multiplied by different types of orthogonal code (e.g., Walsh code) and mapped to the same radio resources. The complex symbol of the CSI-RS for the antenna port 15 is multiplied by [1, 1], and the complex symbol of the CSI-RS for the antenna port 16 is multiplied by [1 −1] and mapped to the same radio resources. The same is true of the antenna ports {17,18}, {19,20} and {21,22}.

A UE may detect a CSI-RS for a specific antenna port by multiplying code by which a transmitted symbol has been multiplied. That is, a transmitted symbol is multiplied by the code [1 1] multiplied in order to detect the CSI-RS for the antenna port 15, and a transmitted symbol is multiplied by the code [1 −1] multiplied in order to detect the CSI-RS for the antenna port 16.

Referring to FIGS. 8(a) to 8(c), in the case of the same CSI-RS configuration index, radio resources according to a CSI-RS configuration having a large number of antenna ports include radio resources having a small number of CSI-RS antenna ports. For example, in the case of a CSI-RS configuration 0, radio resources for the number of eight antenna ports include both radio resources for the number of four antenna ports and radio resources for the number of one or two antenna ports.

A plurality of CSI-RS configurations may be used in one cell. 0 or one CSI-RS configuration may be used for a non-zero power (NZP) CSI-RS, and 0 or several CSI-RS configurations may be used for a zero power (ZP) CSI-RS.

For each bit set to 1 in a zeropower (ZP) CSI-RS ('ZeroPowerCSI-RS) that is a bitmap of 16 bits configured by a high layer, a UE assumes zero transmission power in REs (except a case where an RE overlaps an RE assuming a NZP CSI-RS configured by a high layer) corresponding to the four CSI-RS columns of Table 3 and Table 4. The most significant bit (MSB) corresponds to the lowest CSI-RS configuration index, and next bits in the bitmap sequentially correspond to next CSI-RS configuration indices.

A CSI-RS is transmitted only in a downlink slot that satisfies the condition of (n_s mod 2) in Table 3 and Table 4 and a subframe that satisfies the CSI-RS subframe configurations.

In the case of the frame structure type 2 (TDD), a CSI-RS is not transmitted in a special subframe, a synchronization signal (SS), a subframe colliding against a PBCH or SystemInformationBlockType1 (SIB 1) Message transmission or a subframe configured to paging message transmission.

Furthermore, an RE in which a CSI-RS for any antenna port belonging to an antenna port set S (S={15}, S={15,16}, S={17,18}, S={19,20} or S={21,22}) is transmitted is not used for the transmission of a PDSCH or for the CSI-RS transmission of another antenna port.

Time-frequency resources used for CSI-RS transmission cannot be used for data transmission. Accordingly, data throughput is reduced as CSI-RS overhead is increased. By considering this, a CSI-RS is not configured to be transmitted every subframe, but is configured to be transmitted in each transmission period corresponding to a plurality of subframes. In this case, CSI-RS transmission overhead can be significantly reduced compared to a case where a CSI-RS is transmitted every subframe.

A subframe period (hereinafter referred to as a "CSI transmission period") T_CSI-RS and a subframe offset Δ_CSI-RS for CSI-RS transmission are shown in Table 5.

Table 5 illustrates CSI-RS subframe configurations.

TABLE 5

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}$-5 |
| 15-34 | 20 | $I_{CSI-RS}$-15 |
| 35-74 | 40 | $I_{CSI-RS}$-35 |
| 75-154 | 80 | $I_{CSI-RS}$-75 |

Referring to Table 5, the CSI-RS transmission period T_CSI-RS and the subframe offset Δ_CSI-RS are determined depending on the CSI-RS subframe configuration I_CSI-RS.

The CSI-RS subframe configuration of Table 5 may be configured as one of the aforementioned 'SubframeConfig' field and 'zeroTxPowerSubframeConfig' field. The CSI-RS subframe configuration may be separately configured with respect to an NZP CSI-RS and a ZP CSI-RS.

A subframe including a CSI-RS satisfies Equation 13.

$(10n_f + \lfloor n_s/2 \rfloor - \Delta_{CSI-RS}) \mod T_{CSI-RS} = 0$ [Equation 13]

In Equation 13, T_CSI-RS means a CSI-RS transmission period, Δ_CSI-RS means a subframe offset value, n_f means a system frame number, and n_s means a slot number.

In the case of a UE in which the transmission mode 9 has been configured with respect to a serving cell, one CSI-RS resource configuration may be configured for the UE. In the case of a UE in which the transmission mode 10 has been configured with respect to a serving cell, one or more CSI-RS resource configuration (s) may be configured for the UE.

In the current LTE standard, a CSI-RS configuration includes an antenna port number (antennaPortsCount), a subframe configuration (subframeConfig), and a resource configuration (resourceConfig). Accordingly, the a CSI-RS configuration provides notification that a CSI-RS is transmitted how many antenna port, provides notification of the period and offset of a subframe in which a CSI-RS will be transmitted, and provides notification that a CSI-RS is transmitted in which RE location (i.e., a frequency and OFDM symbol index) in a corresponding subframe.

Specifically, the following parameters for each CSI-RS (resource) configuration are configured through high layer signaling.

If the transmission mode 10 has been configured, a CSI-RS resource configuration identifier A CSI-RS port number (antennaPortsCount): a parameter (e.g., one CSI-RS port, two CSI-RS ports, four CSI-RS ports or eight CSI-RS ports) indicative of the number of antenna ports used for CSI-RS transmission A CSI-RS configuration (resourceConfig) (refer to Table 3 and Table 4): a parameter regarding a CSI-RS allocation resource location A CSI-RS subframe configuration (subframeConfig, that is, I_CSI-RS) (refer to Table 5): a parameter regarding the period and/or offset of a subframe in which a CSI-RS will be transmitted If the transmission mode 9 has been configured, transmission power P_C for CSI feedback: in relation to the assumption of a UE for reference PDSCH transmission power for feedback, when the UE derives CSI feedback and takes a value within a [−8, 15] dB range in a 1-dB step size, P_C is assumed to be the ratio of energy per resource element (EPRE) per PDSCH RE and a CSI-RS EPRE.

If the transmission mode 10 has been configured, transmission power P_C for CSI feedback with respect to each CSI process. If CSI subframe sets C_CSI,0 and C_CSI,1 are configured by a high layer with respect to a CSI process, P_C is configured for each CSI subframe set in the CSI process.

A pseudo-random sequence generator parameter n_ID

If the transmission mode 10 has been configured, a high layer parameter 'qcl-CRS-Info-r11' including a QCL scrambling identifier for a quasico-located (QCL) type B UE assumption (qcl-ScramblingIdentity-r11), a CRS port count (crs-PortsCount-r11), and an MBSFN subframe configuration list (mbsfn-SubframeConfigList-r11) parameter.

When a CSI feedback value derived by a UE has a value within the [−8, 15] dB range, P_C is assumed to be the ration of PDSCH EPRE to CSI-RS EPRE. In this case, the PDSCH EPRE corresponds to a symbol in which the ratio of PDSCH EPRE to CRS EPRE is ρ_A.

A CSI-RS and a PMCH are not configured in the same subframe of a serving cell at the same time.

In the frame structure type 2, if four CRS antenna ports have been configured, a CSI-RS configuration index belonging to the [20-31] set (refer to Table 3) in the case of a normal CP or a CSI-RS configuration index belonging to the [16-27] set (refer to Table 4) in the case of an extended CP is not configured in a UE.

A UE may assume that the CSI-RS antenna port of a CSI-RS resource configuration has a QCL relation with delay spread, Doppler spread, Doppler shift, an average gain and average delay.

A UE in which the transmission mode 10 and the QCL type B have been configured may assume that antenna ports 0-3 corresponding to a CSI-RS resource configuration and antenna ports 15-22 corresponding to a CSI-RS resource configuration have QCL relation with Doppler spread and Doppler shift.

In the case of a UE in which the transmission modes 1-9 have been configured, one ZP CSI-RS resource configuration may be configured in the UE with respect to a serving cell. In the case of a UE in which the transmission mode 10 has been configured, one or more ZP CSI-RS resource configurations may be configured in the UE with respect to a serving cell.

The following parameters for a ZP CSI-RS resource configuration may be configured through high layer signaling.

The ZP CSI-RS configuration list (zeroTxPowerResourceConfigList) (refer to Table 3 and Table 4): a parameter regarding a zero-power CSI-RS configuration The ZP CSI-RS subframe configuration (eroTxPowerSubframeConfig, that is, I_CSI-RS) (refer to Table 5): a parameter regarding the period and/or offset of a subframe in which a zero-power CSI-RS is transmitted A ZP CSI-RS and a PMCH are not configured in the same subframe of a serving cell at the same time.

In the case of a UE in which the transmission mode 10 has been configured, one or more channel state information-interference measurement (CSI-IM) resource configurations may be configured in the UE with respect to a serving cell.

The following parameters for each CSI-IM resource configuration may be configured through high layer signaling.

The ZP CSI-RS configuration (refer to Table 3 and Table 4)

The ZP CSI RS subframe configuration I_CSI-RS (refer to Table 5)

A CSI-IM resource configuration is the same as any one of configured ZP CSI-RS resource configurations.

A CSI-IM resource and a PMCH are not configured within the same subframe of a serving cell at the same time.

Massive MIMO

A MIMO system having a plurality of antennas may be called a massive MIMO system and has been in the spotlight as means for improving spectrum efficiency, energy efficiency and processing complexity.

In recent 3GPP, in order to satisfy the requirements of spectrum efficiency for a future mobile communication system, a discussion about the massive MIMO system has started. The massive MIMO is also called full-dimension MIMO (FD-MIMO).

In a wireless communication system after LTE Release (Rel)-12, the introduction of an active antenna system (AAS) is considered.

Unlike the existing passive antenna system in which an amplifier and antenna capable of adjusting the phase and size of a signal have been separated, the AAS means a system in which each antenna is configured to include an active element, such as an amplifier.

The AAS does not require a separate cable, connector and other hardware for connecting an amplifier and an antenna because the active antenna is used, and thus has a high efficiency characteristic in terms of energy and operating costs. In particular, the AAS enables an advanced MIMO technology, such as the formation of an accurate beam pattern or 3D beam pattern in which a beam direction and a beam width are considered because the AAS supports each electronic beam control method.

Due to the introduction of an advanced antenna system, such as the AAS, a massive MIMO structure having a plurality of input/output antennas and a multi-dimension antenna structure is also considered. For example, unlike in the existing straight type antenna array, if a two-dimensional (2D) antenna array is formed, a 3D beam pattern can be formed by the active antenna of the AAS.

FIG. 9 illustrates a 2D-AAS having 64 antenna elements in a wireless communication system to which the present invention may be applied.

FIG. 9 illustrates a common 2D antenna array. A case where $N\_t=N\_v \cdot N\_h$ antennas has a square form as in FIG. 9 may be considered. In this case, $N\_h$ indicates the number of antenna columns in a horizontal direction, and $N\_v$ indicates the number of antenna rows in a vertical direction.

If the antenna array of such a 2D structure is used, radio waves can be controlled both in the vertical direction (elevation) and the horizontal direction (azimuth) so that a transmission beam can be controlled in the 3D space. A wavelength control mechanism of such a type may be called 3D beamforming.

FIG. 10 illustrates a system in which an eNB or UE has a plurality of transmission/reception antennas capable of forming a 3D beam based on the AAS in a wireless communication system to which the present invention may be applied.

FIG. 10 is a diagram of the aforementioned example and illustrates a 3D MIMO system using a 2D antenna array (i.e., 2D-AAS).

From the point of view of a transmission antenna, if a 3D beam pattern is used, a semi-static or dynamic beam can be formed in the vertical direction of the beam in addition to the horizontal direction. For example, an application, such as the formation of a sector in the vertical direction, may be considered.

Furthermore, from the point of view of a reception antenna, when a reception beam is formed using a massive reception antenna, a signal power rise effect according to an antenna array gain may be expected. Accordingly, in the case of the uplink, an eNB can receive a signal from a UE through a plurality of antennas. In this case, there is an advantage in that the UE can set its transmission power very low by considering the gain of the massive reception antenna in order to reduce an interference influence.

FIG. 11 illustrates a 2D antenna system having cross-polarizations in a wireless communication system to which the present invention may be applied.

A 2D planar antenna array model in which polarization is considered may be diagrammed as shown in FIG. 11.

Unlike the existing MIMO system according to a passive antenna, a system based on an active antenna can dynamically control the gain of an antenna element by applying weight to an active element (e.g., an amplifier) to which each antenna element has been attached (or included). The antenna system may be modeled in an antenna element level because a radiation pattern depends on the number of antenna elements and an antenna arrangement, such as antenna spacing.

An antenna array model, such as the example of FIG. 11, may be represented by (M, N, P). This corresponds to a parameter that characterizes an antenna array structure.

M indicates the number of antenna elements having the same polarization in each column (i.e., the vertical direction) (i.e., the number of antenna elements having a +45° slant in each column or the number of antenna elements having a −45° slant in each column).

N indicates the number of columns in the horizontal direction (i.e., the number of antenna elements in the horizontal direction).

P indicates the number of dimensions of polarization. P=2 in the case of cross-polarization as in the case of FIG. 11, or P=1 in the case of co-polarization.

An antenna port may be mapped to a physical antenna element. The antenna port may be defined by a reference signal related to a corresponding antenna port. For example, in the LTE system, the antenna port 0 may be related to a cell-specific reference signal (CRS), and the antenna port 6 may be related to a positioning reference signal (PRS).

For example, an antenna port and a physical antenna element may be mapped in a one-to-one manner. This may correspond to a case where a single cross-polarization antenna element is used for downlink MIMO or downlink transmit diversity. For example, the antenna port 0 is mapped to one physical antenna element, whereas the antenna port 1 may be mapped to the other physical antenna element. In this case, from the point of view of a UE, two types of downlink transmission are present. One is related to a reference signal for the antenna port 0, and the other is related to a reference signal for the antenna port 1.

For another example, a single antenna port may be mapped to multiple physical antenna elements. This may correspond to a case where a single antenna port is used for beamforming. In beamforming, multiple physical antenna elements are used, so downlink transmission may be directed toward a specific UE. In general, this may be achieved using an antenna array configured using multiple columns of multiple cross-polarization antenna elements. In this case, from the point of view of a UE, one type of downlink transmission generated from a single antenna port is present. One is related to a CRS for the antenna port 0, and the other is related to a CRS for the antenna port 1.

That is, an antenna port indicates downlink transmission from the point of view of a UE not actual downlink transmission from a physical antenna element by an eNB.

For another example, a plurality of antenna ports is used for downlink transmission, but each antenna port may be mapped to multiple physical antenna elements. This may correspond to a case where an antenna array is used for downlink MIMO or downlink diversity. For example, each of the antenna ports 0 and 1 may be mapped to multiple physical antenna elements. In this case, from the point of view of a UE, two types of downlink transmission. One is related to a reference signal for the antenna port 0, and the other is related to a reference signal for the antenna port 1.

In FD-MIMO, the MIMO precoding of a data stream may experience antenna port virtualization, transceiver unit (or a transmission and reception unit) (TXRU) virtualization, and an antenna element pattern.

In the antenna port virtualization, a stream on an antenna port is precoded on a TXRU. In the TXRU virtualization, a TXRU signal is precoded on an antenna element. In the antenna element pattern, a signal radiated by an antenna element may have a directional gain pattern.

In the existing transceiver modeling, a static one-to-one mapping between an antenna port and a TXRU is assumed, and a TXRU virtualization effect is joined into a static (TXRU) antenna pattern including the effects of the TXRU virtualization and the antenna element pattern.

The antenna port virtualization may be performed by a frequency-selective method. In LTE, an antenna port, together with a reference signal (or pilot), is defined. For example, for precoded data transmission on an antenna port, a DMRS is transmitted in the same bandwidth as a data signal, and both the DMRS and data are precoded by the same precoder (or the same TXRU virtualization precoding). For CSI measurement, a CSI-RS is transmitted through multiple antenna ports. In CSI-RS transmission, a precoder that characterizes mapping between a CSI-RS port and a TXRU may be designed in a unique matrix so that a UE can estimate a TXRU virtualization precoding matrix for a data precoding vector.

A TXRU virtualization method is discussed in 1D TXRU virtualization and 2D TXRU virtualization, which are described below with reference to the following drawing.

FIG. 12 illustrates a transceiver unit model in a wireless communication system to which the present invention may be applied.

In the 1D TXRU virtualization, M_TXRU TXRUs are related to M antenna elements configured in a single column antenna array having the same polarization.

In the 2D TXRU virtualization, a TXRU model configuration corresponding to the antenna array model configuration (M, N, P) of FIG. 11 may be represented by (M_TXRU, N, P). In this case, M_TXRU means the number of TXRUs present in the 2D same column and same polarization, and always satisfies M-TXRU≤M. That is, the total number of TXRUs is the same as M_TXRU×N×P.

A TXRU virtualization model may be divided into a TXRU virtualization model option-1: sub-array partition model as in FIG. 12($a$) and a TXRU virtualization model option-2: full connection model as in FIG. 12($b$) depending on a correlation between an antenna element and a TXRU.

Referring to FIG. 12($a$), in the case of the sub-array partition model, an antenna element is partitioned into multiple antenna element groups, and each TXRU is connected to one of the groups.

Referring to FIG. 12($b$), in the case of the full-connection model, the signals of multiple TXRUs are combined and transferred to a single antenna element (or the arrangement of antenna elements).

In FIG. 12, q is the transmission signal vectors of antenna elements having M co-polarizations within one column. W is a wideband TXRU virtualization vector, and W is a wideband TXRU virtualization matrix. X is the signal vectors of M_TXRU TXRUs.

In this case, mapping between an antenna port and TXRUs may be one-to-one or one-to-many.

In FIG. 12, mapping between a TXRU and an antenna element (TXRU-to-element mapping) shows one example, but the present invention is not limited thereto. From the point of view of hardware, the present invention may be identically applied to mapping between an TXRU and an antenna element which may be implemented in various forms.

Method of Transmitting Ore Receiving Hybrid Channel State Information (Hybrid CSI)

Rel-13 CSI Process Configuration

1. Introduction

A CSI process for supporting both non-precoded CSI-RS and beamformed CSI-RS-based schemes is as follows.

The CSI process is related to K (K>=1) CSI-RS resources/configurations. In this case, a CSI-RS port number for the k-th CSI-RS resource of all of the K CSI-RS resources/configurations is N_k.

In the case of a class A CSI report (i.e., a non-precoded CSI-RS-based CSI report), a total number of CSI-RS ports within a single CSI process is 16.

In the case of the class A CSI report, one of the following alternatives may be used.

Alt. 1: a CSI-RS resource/configuration of N_k=12/16 may be previously defined. That is, it may be configured for a CSI process in which the index of a CSI-RS configuration is K=1.

Alt. 2: in the case of a 12/16 port CSI-RS, K (K>1) CSI-RS resources/configurations of 2/4/8 ports may be aggregated.

In the class A CSI report and the class B CSI report (i.e., a beamformed CSI-RS-based CSI report) (if CSI-IM is supported and used), one of the following alternatives may be selected with respect to CSI-IM and CSI resource/configuration associated with a CSI process.

Alt. 1: a single CSI process is related to one CSI-IM (common interference measurement resources for all of CSI resources/configurations within the single CSI process).

Alt. 2: a single CSI process may be associated with multiple CSI-IMs.

RRC signaling supports different CSI resources/configurations associated with different CSI-IM resource configurations.

2. Class A-Related Configurations

In the class A CSI report, a UE implies the reporting of CSI according to codebook W=W1W2 based on a {8, 12, 16} CSI-RS port.

For the RRC configuration of an CSI resource/configuration, one of the following alternatives may be selected.

Alt. 1: a CSI-RS resource/configuration, that is, N_k=12/16, may be previously defined. That is, this may be configured for a CSI process in which the index of a CSI-RS configuration is K=1.

Alt. 2: in the case of a 12/16 port CSI-RS, K (K>1) CSI-RS resource/configurations of 2/4/8 ports may be aggregated.

The Alt. 1 means that at least one new CSI reference signal configuration (e.g., in the case of 16 ports) is added and previously defined (i.e., fixed to the standard). In this case, when Class A is indicated in the configuration, K=1 is always applied for a corresponding CSI process configuration. Alt.1 has advantages in that an UE implementation case is minimized and enhancement can be easily incorporated into a table defined in the existing standard.

Alt.2 permits flexibility compared to Alt. 1 in an RRC configuration accompanied by K (>1) CSI-RS resources. In this case, in order to perform a corresponding class A CSI report, multiple CSI-RS resource to be measured by a UE are aggregated. Although Alt.2 has an advantage in network flexibility in which K CSI-RS resources are aggregated, consideration needs to be taken of so that Alt.2 has a proper restriction within a configuration for a subframe configuration, in particular.

Proposal 1: a maximum time difference between any configured ports within a CSI-RS resource should not exceed 0.28 ms by taking into consideration significant performance deterioration attributable to a phase drift.

Proposal 2: on the assumption that the proposal given in the Proposal 1 is satisfied, various possible CSI-RS patterns may be listed up so that whether Alt. 1 configuration is selected or Alt. 2 configuration is selected may be determined.

3. Class B-Related Configurations

A class B CSI report implies that one of the following four alternatives is assumed and a UE reports L port CSI based on the measurement of K beamformed CSI-RS resources: each one having N_k port.

Alt. 1: an indicator for beam selection and an L port CQI/PMI/RI for a selected beam. A total number of configured ports is greater than L in all of CSI-RS resources within a CSI process.

Alt. 2: an L port precoder from a codebook common to 2 polarizations and into which both a beam selection(s) and co-phasing are incorporated. A total number of configured ports within a CSI process is L.

Alt. 3: a codebook into which a beam selection and L port CSI for a selected beam have been incorporated. a total number of configured ports is greater than L in all of CSI-RS resources within a CSI process.

Alt. 4: an L port CQI/PMI/RI. A total number of configured ports within a CSI process is L. (if a CSI measurement restriction (MR) is supported, an L port CQI/PMI/RI is always set)

Specifically, in the Alt. 1 and Alt. 3, in order for a UE to select at least one preferred beamformed CSI-RS resource from all of K CSI-RS resources configured within the CSI process of Class B, in general, K>1 is taken into consideration. For such selection feedback, Alt. 1 is based on a beam indicator (BI) report. In contrast, Alt. 3 is based on a selection codebook-based report. Rel-13 is focused on a single beamformed CSI-RS resource selection due to a limited time frame, so the Alt. 1 may be selected in a simple form of selection feedback. In contrast, in next Rel, in order to obtain a vertical rank greater than 1, it is preferred that an extended case where one or more CSI-RS resources are selected is researched. In such a case, an Alt. 3-based selection codebook structure may be more proper.

With respect to a maximum value of K within the RRC configuration of a newly defined CSI process, it is preferred that a Class B report scheme is taken into consideration in order to research that which scheme has the best performance and that K for such performance has which value.

Proposal 3: in Rel-13, a maximum value of K may be 16 based on the Class B scheme (a combination of Alt. 1 (BI feedback) and Alt. 4 (always MR on)) having the best performance.

A maximum number of all of CSI-RS ports within a single CSI process may be defined as 64 that is the same as a total number of TXRUs taken into consideration in Rel-13. In this case, If K=16 within one CSI process is a maximum based on Proposal 1, N_k for each k CSI-RS resource may be 4. For another example, K=8 in a single CSI process, and N_k for each k CSI-RS resource may be 8. In either case, a maximum number of all of CSI-RS ports within a single CSI process may be limited up to 64.

Proposal 4: a maximum number of all of CSI-RS ports within a single CSI process may be 64, that is, the same as a total number of TXRUs taken into consideration in Rel-13.

4. CSI-IM-Related Configurations

Alt. 1: one CSI process is associated with a single CSI-IM. (common interference measurement resource for all of CSI resources/configurations within a single CSI process)

Alt. 4: a single CSI process is associated with multiple CSI-IMs.

RRC signaling supports different CSI resources/configurations associated with different CSI-IM resource configurations.

Such an issue is related to whether a CSI process configuration for Class B can be used to support which virtual sectorization scenario, assuming that each virtual sector independently operates so that an individual CSI-IM resource for each sector is configured in a UE. More specifically, if an independent CSI-IM resource associated with a k-th (in this case, k=1, 2, . . . , k) CSI-RS resource is supported within one CSI process configuration, preferred CSI-RS resource selection feedback of a UE may be efficiently used for a dynamic virtual sector selection operation. Furthermore, if each CSI-RS is transmitted by a different transmission point (TP), such a CSI process configuration may also be used for a CoMP operation as a distributed antenna scenario. In summary, it is preferred that the case of the Class B-based CSI process configuration is not restricted.

Proposal 5: it may be advantageous to support the flexible utilization of the Rel-13 CSI process for Class B depending on a network implementation by allowing an independent CSI-IM resource configuration associated with a k-th (in this case, k=1, 2, . . . , K) CSI-RS resource.

Beamformed CSI-RS Configuration

1. Introduction

A CSI report is accompanied by a PMI.

A CSI process may be configured as a 2-CSI report class A or B.

In the case of Class A, a UE reports CSI according to W=W1W2 codebook based on a {8,12,16} CSI-RS port.

In the case of Class B, a UE reports L port CSI, assuming one of the following four alternatives.

Alt. 1: an indicator for beam selection and an L port CQI/PMI/RI for a selected beam. A total number of all of configured ports is greater than L in all of CSI-RS resources within a CSI process.

Alt. 2: an L port precoder from a codebook that is common to a polarization and into which both a beam selection(s) and co-phasing are incorporated. A total number of configured ports within a CSI process is L.

Alt. 3: a codebook into which a beam selection and L port CSI for a selected beam have been incorporated. A total number of all of configured ports is greater than L in all of CSI-RS resources within a CSI process.

Alt. 4: an L port CQI/PMI/RI. A total number of configured ports within a CSI process is L. (if a CSI measurement restriction (MR) is supported, the L port CQI/PMI/RI is always set)

In this case, a beam selection may be the selection of a subset of antenna ports within a single CSI-RS resource or the selection of a CSI-RS resource from a set of resources.

Furthermore, a reported CSI may correspond to the extension of Rel-12 L port CSI.

In the alternatives 1, 2, 3 and 4 of the CSI report class B, N_k∈{1,2,4,8}.

In the case of Alt. 1, a UE reports L port CSI, assuming one of L=N_k and L (<=N_k) (it may be configured or fixed).

In the case of Alt. 2, a UE reports L port CSI. In this case, L may be the sum of all of ks (i.e., L=sum(N_k)) or K may be always 1 (i.e., L=N_1).

In the case of Alt. 3, a UE reports L port CSI on the assumption of one of L=N_k and L (<=N_k) (it may be configured or fixed).

In the case of Alt. 4, a UE reports L port CSI, assuming L=N_k.

2. Merged Operation Proposed for Class B CSI Report

Both Alt. 1 and Alt. 3 of the four alternatives have similar operation objects. In this case, in order for a UE to select at least one preferred beamformed CSI-RS resource from all of K CSI-RS resources configured within the CSI process of Class B, in general, K>1 is taken into consideration. For such selection feedback, Alt. 1 is based on a beam indicator (BI) report. In contrast, Alt. 3 is based on a selection codebook-based report. Rel-13 is focused on a single beamformed CSI-RS resource selection due to a limited time frame, so the Alt. 1 may be selected in a simple form of selection feedback. In contrast, in next Rel, in order to obtain a vertical rank greater than 1, it is preferred that an extended case where one or more CSI-RS resources are selected is researched. In such a case, an Alt. 3-based selection codebook structure may be more proper.

Observation 1: in Rel-13, it may be sufficient to select Alt. 1 from Alt. 1 and Alt. 3 as a simple form of selection feedback by taking into consideration that Rel-13 is focused on a single beamformed CSI-RS resource selection.

Alt. 2 may be dependent on only short-term W2 feedback from a UE, and thus Alt. 2 has a motivation different from that of Alt. 1 or Alt. 3. In this case, a W1 beamforming coefficient may be construed as being previously applied to a beamformed CSI-RS resource that is always K=1 for a CSI process.

For such a beamforming coefficient, different beam directions may be previously applied to every 2 port pairs having different polarizations. Accordingly, the W2 feedback of a UE may be used by an eNB stage as beam selection information in addition to co-phasing for different (polarization). In a performance viewpoint, however, the scheme of Alt. 2 may be more sensitive within a beam coefficient adaptation frequency compared to the Alt. 1-based scheme. The reason for this is that Alt. 1 is based on CSI-RS resource selection so that W1 and W2 are chiefly reported by a UE on a selected CSI-RS resource. In contrast, the scheme of Alt. 2 is based on the W2 feedback of a UE because the existing W1 component cannot be accommodated by the CSI feedback of the UE.

Observation 2: since W1 feedback is substituted with an eNB implementation except the CSI feedback of a UE, Alt.2 accompanied by only W2 feedback shows more sensitive results compared to the Alt. 1-based scheme within a beam coefficient adaptation frequency.

Alt. 4 is for an L port CSI report assuming that a measurement restriction (MR) is always on. In this case, this means that a total number of configured ports within a CSI process is L and a CSI-RS resource of K=1 has been configured within the CSI process. The scheme of Alt. 4 can be used for a beamformed CSI-RS-based operation very efficiently in terms that network CSI-RS overhead is significantly reduced by a CSI-RS pooling between multiple UEs. More specifically, the Alt. 4-based CSI process may be configured in a UE, and the CSI-RS measurement instance of the UE may be controlled by an eNB, for example, L1 signaling. Accordingly, the CSI feedback of the UE may be performed based on an indicated measurement instance, and other CSI-RS transmission instances may be reused for the CSI feedback of another UE. As a result, network overhead can be significantly reduced.

The scheme of Alt. 4 may be preferred to support an efficient beamformed CSI-RS-based operation because a different UE-specific beamforming coefficient may be freely applied to Alt. 4-based CSI-RS resources.

Observation 3: it is preferred that Alt.4 accompanied by the always-on MR is supported to significantly reduce network CSI-RS overhead by CSI-RS resource pooling between multiple UEs.

The following operation based on two CSI processes configured in a UE based on analysis for the aforementioned observation and beamformed CSI-RS-based scheme may be taken into consideration.

i) A CSI process #1 Class B based on Alt. 1: K(>1) CSI-RS resources are configured.

An eNB periodically transmits K CSI-RSs. The transmission cycle may be long, for example, 50 ms or 100 ms.

The UE reports an RI/PMI/CQI on a selected CSI-RS resource in addition to a BI.

The report cycle of the BI may be longer than CSI.

The reported BI may be used to transmit a CSI-RS associated with a CSI process #2.

ii) A CSI process #2 of Class B based on Alt.4: K=1 CSI-RS resource is configured.

The eNB applies to a CSI-RS in which a UE-specific beamforming coefficient is transmitted using the reported BI in a single measurement subframe triggered for the UE.

The UE reports an RI/PMI/CQI based on an indicated single measurement subframe.

In accordance with the operation, the configured CSI-RS resource may be reused between multiple UEs. In this case, the applied beamforming coefficient may be freely selected by the eNB in each CSI-RS transmission instance.

Proposal 1: a merged operation between Alt. 1 accompanied by BI feedback and Alt. 4 accompanied by a single subframe measurement restriction are supported in Rel-13.

A CSI Report of Class B Accompanied by BI Feedback

1. Introduction

A CSI report is accompanied by a PMI.

A CSI process may be configured as two CSI report classes A or B.

In the case of Class A, a UE reports CSI according to a W=W1W2 codebook based on {8,12,16} CSI-RS ports.

In the case of Class B, a UE reports L port CSI on the assumption of one of the following four alternatives.

Alt. 1: an indicator for beam selection and an L port CQI/PMI/RI for a selected beam. A total number of configured ports is greater than L in all of CSI-RS resources within a CSI process.

Alt. 2: an L port precoder from a codebook common to 2 polarizations and into which both a beam selection(s) and co-phasing are incorporated. A total number of configured ports within a CSI process is L.

Alt. 3: a codebook into which a beam selection and L port CSI for a selected beam have been incorporated. a total number of configured ports is greater than L in all of CSI-RS resources within a CSI process.

Alt. 4: an L port CQI/PMI/RI. A total number of configured ports within a CSI process is L. (if a CSI measurement restriction (MR) is supported, an L port CQI/PMI/RI is always set)

In this case, the beam selection may be the selection of a subset of antenna ports within a single CSI-RS resource or the selection of a CSI-RS resource from a set of resources.

Furthermore, the reported CSI may correspond to the extension of Rel-12 L port CSI.

In the alternatives 1, 2, 3 and 4 of CSI report class B, $N\_k \in \{1,2,4,8\}$.

In the case of Alt. 1, a UE reports L port CSI on the assumption of one of $L=N\_k$ and $L (<=N\_k)$ (this may be set or fixed).

In the case of Alt. 2, the UE reports L port CSI. In this case, L may be the sum of all of ks (i.e., $L=\text{sum}(N\_k)$) or K may be always 1 (i.e., $L=N\_1$).

In the case of Alt. 3, the UE reports L port CSI on the assumption of one of $L=N\_k$ and $L (<=N\_k)$ (this may be set or fixed).

In the case of Alt. 4, the UE reports L port CSI on the assumption of $L=N\_k$.

2. Discussion i) A CSI process #1 Class B based on Alt. 1: K(>1) CSI-RS resources are configured.

An eNB periodically transmits K CSI-RSs. The transmission cycle may be long, for example, 50 ms or 100 ms.

The UE reports an RI/PMI/CQI on a selected CSI-RS resource in addition to a BI.

The report cycle of the BI may be longer than CSI.

The reported BI may be used to transmit a CSI-RS associated with a CSI process #2.

ii) A CSI process #2 of Class B based on Alt.4: K=1 CSI-RS resource is configured.

The eNB applies to a CSI-RS in which a UE-specific beamforming coefficient is transmitted using the reported BI in a single measurement subframe triggered for the UE.

The UE reports an RI/PMI/CQI based on an indicated single measurement subframe.

In accordance with the operation, the configured CSI-RS resource may be reused between multiple UEs. In this case, the applied beamforming coefficient may be freely selected by the eNB in each CSI-RS transmission instance.

By considering that the aforementioned efficient operation is used, a maximum number of CSI-RS resources which may be configured to the CSI process #1 may be required. In evaluation for determining a maximum value of K, antenna configurations (8, 2, 2, 32) are taken into consideration. 1×, 2× and 4× oversampling for a vertical domain are applied, and thus K=8, 16 and 32 are taken into consideration for the evaluations. Simply speaking, $N\_k=4$ is the same in all of ks (=1, 2, ..., K), and thus a total number of CSI-RS ports within the CSI process #1 is $N\_k \cdot K$. If ZP-CSI-RS overhead is also taken into consideration, the total CSI-RS overhead for the CSI process #1 is $3 \cdot N\_k \cdot K$ (if a 3-cell reuse factor is taken into consideration). A CSI-RS for the CSI process #1 is assumed to be transmitted in the same cycle as the BI feedback cycle. In Table 7, the CSI-RS was evaluated to be a cycle of 50 ms, 100 ms or 200 ms.

In the CSI process #2, CSI-RS overhead is applied depending on the number of separate BIs (indicated by Y) reported by all active UEs within a site (including 3 cells). Accordingly, the total CSI-RS overhead including a ZP-CSI-RS(s) for each site is $N\_k \cdot Y$. For example, if four active UEs are present, one of the four active UEs reports BI=1, and the remaining three UEs of them reports BI=3 identically, the number of reported separate BIs is Y=2, and thus the total CSI-RS overhead for the CSI process #2 is $N\_k \cdot 2$.

Table 6 summarizes the number of RE(s) for NZP and ZP CSI-RS(s) for each site and average CSI-RS overhead (RE(s)/RB/subframe unit) used in simulations for the CSI processes #1 and #2. A wideband BI report is taken into consideration and other simulation assumptions are described in Table 9.

Table 6 illustrates CSI-RS overhead assumptions for a simulation in which $N\_k=4$.

TABLE 6

|  | CSI process #1 | CSI process #2 |
| --- | --- | --- |
| Number of REs for NZP and ZP CSI-RSs | $3 \cdot N\_k \cdot K$ | $N\_k \cdot Y$ |
| Average CSI-RS overhead (REs/RB/subframe) | $0.24 \cdot K$ (in a 50 ms cycle)<br>$0.12 \cdot K$ (in a 100 ms cycle)<br>$0.06 \cdot K$ (in a 200 ms cycle) | $0.8 \cdot Y$ |

Table 7 illustrates non-full buffer simulation results for K=8, 16 or 32 CSI-RS resources in a 3D-urban micro (UMi) scenario.

TABLE 7

|  | Average UE throughput (bps/Hz) | Average UE throughput gain | 5% UE throughput (bps/Hz) | 5% UE throughput gain | 50% UE throughput (bps/Hz) | Resource utilization | FTP load, $\lambda$ (UEs/s/sector) |
|---|---|---|---|---|---|---|---|
| 8 beams | 3.880 | — | 1.476 | — | 4.211 | 0.16 | 1.5 |
| 16 beams | 3.871 | 100% | 1.504 | 102% | 4.167 | 0.15 |  |
| 32 beams | 3.780 | 97% | 1.418 | 96% | 4.000 | 0.16 |  |
| 8 beams | 2.955 | — | 0.762 | — | 2.685 | 0.34 | 2.5 |
| 16 beams | 2.964 | 100% | 0.786 | 103% | 2.731 | 0.34 |  |
| 32 beams | 2.829 | 96% | 0.731 | 96% | 2.564 | 0.35 |  |
| 8 beams | 2.173 | — | 0.324 | — | 1.717 | 0.59 | 3.5 |
| 16 beams | 2.204 | 101% | 0.351 | 108% | 1.770 | 0.57 |  |
| 32 beams | 2.053 | 95% | 0.308 | 95% | 1.606 | 0.60 |  |

As may be seen from Table 6, the 16 vertical beams show slightly better performance, particularly, in the case of 5% UE compared to the 8 and 32 vertical beams. The 16 beams are evaluated to have a better throughput increment attributable to vertical beams than a corresponding CSI-RS overhead increment compared to the 8 beams. The 16 beams has an inverse tendency because a throughput increment attributable to an increase of vertical beams is very marginal compared to the 32 beams. Accordingly, the 16 beams may be considered to achieve a throughput gain for the beamformed CSI-RS-based operation.

Proposal 1: a maximum value of K may be 16 based on the observation of the maximum throughput gain for the beamformed CSI-RS-based operation.

The vertical beam selection results of a UE may be reported through BI feedback as in Alt. 1. Evaluation results according to a different BI feedback may be given as follows. A CSI process configuration and CSI-RS overhead are assumed according to the same method as that of the aforementioned evaluation. 50/100/200 ms is used as the Bi cycle, and 16 vertical beams are used for the following evaluation by taking into consideration the highest performance over the 8 and 32 beam cases from Table 6.

Table 8 illustrates non-full buffer simulation results for 50/100/200 ms Bi cycles in the 3D-urban micro (UMi) scenario.

TABLE 8

|  | Average UE throughput (bps/Hz) | Average UE throughput gain | 5% UE throughput (bps/Hz) | 5% UE throughput gain | 50% UE throughput (bps/Hz) | resource utilization | FTP load, $\lambda$ (UEs/s/sector) |
|---|---|---|---|---|---|---|---|
| 50 ms Bi cycle | 3.871 | — | 1.504 | — | 4.167 | 0.15 | 1.5 |
| 100 ms Bi cycle | 3.868 | 100% | 1.509 | 99% | 4.124 | 0.16 |  |
| 200 ms Bi cycle | 4.050 | 100% | 1.509 | 104% | 4.348 | 0.15 |  |
| 50 ms Bi cycle | 2.964 | — | 0.786 | — | 2.731 | 0.34 | 2.5 |
| 100 ms Bi cycle | 2.982 | 102% | 0.803 | 100% | 2.740 | 0.34 |  |
| 200 ms Bi cycle | 3.035 | 102% | 0.802 | 100% | 2.740 | 0.34 |  |
| 50 ms Bi cycle | 2.204 | — | 0.351 | — | 1.770 | 0.57 | 3.5 |
| 100 ms Bi cycle | 2.223 | 103% | 0.359 | 103% | 1.818 | 0.57 |  |
| 200 ms Bi cycle | 2.251 | 106% | 0.371 | 100% | 1.778 | 0.56 |  |

As the BI feedback cycle increases, total throughput is not significantly changed. The reason for this is that throughput gains obtained by low CSI-RS overhead can compensate for throughput degradation caused by an increasing Bi cycle. In other words, longer BI feedback does not have a great influence on throughput. If a network and the complexity of a UE are taken into consideration, the cycle of long (e.g., 100 ms) BI feedback as described above may be preferred.

Proposal 2: in a system in which a long BI feedback cycle (e.g., 100, 200 ms) is taken into consideration, a general marginal increase of CSI-RS overhead is accompanied and is observed to be sufficient to the beamformed CSI-RS-based operation.

Table 9 show simulation parameters and assumptions.

TABLE 9

| | |
|---|---|
| Scenario | 3D-UMi in which ISD = 200 m within 2 GHz |
| BS antenna configuration | antenna component configuration: 8 × 2 × 2 (+/−45), 0.5λ horizontal/ 0.8 λ vertical antenna spacing |
| MS antenna configuration | 2 Rx X-pol (0/+90) |
| System bandwidth | 10 MHz (50RBs) |
| UE attachment | (equation) based on RSRP from CRS 0 port |
| Duplex | FDD |
| Network synchronization | Synchronized |
| UE distribution | According to TR36.873 |
| UE speed | 3 km/h |
| Polarization antenna modeling | model-2 of TR36.873 |
| UE array orientation | Uniformly distributed at $\Omega\_UT,\alpha$ [0,360] degrees, $\Omega\_UT,\beta$ = 90 degrees, $\Omega\_UT,\gamma$ = 0 degree |
| UE antenna pattern | Isotropic antenna gain pattern $A'(\theta', \Phi'')$ = 1 |
| Traffic model | FTP model 1 whose packet size is 0.5 Mbyte (low ~20% RU, middle ~50% RU, high ~70% RU) [3] |
| Scheduler | Frequency selective scheduling (multiple UEs for each TTI are permitted) |
| Receiver | Non-ideal channel estimation and interference modeling, a detailed guideline complies with Rel-12 [71-12] assumption LMMSE-IRC receiver, a detailed guideline complies with Rel-12 [71-12] assumption |
| CSI-RS, CRS | a CSI-RS port is mapped to all TXRUs corresponding to one column of a co-polarized antenna component, and a CRS port 0 is associated with the first column of +45-degree polarization, and the CRS port 0 is mapped to the first TXRU. |
| Hybrid ARQ | Maximum of 4 times of transmission |
| Feedback | PUSCH 3-2 CQI, PMI and RI report triggered for each 5 ms feedback delay is 5 ms Rel-8 4Tx codebook for horizontal PMI feedback |
| Overhead | 3 symbols for DL CCHs, DM-RS. CSI-RS overhead mapped to 2 CRS ports and 12 REs for each PRB described above |
| Transmission scheme | Dynamic SU/MU-MIMO (no CoMP) accompanied by TM10, two CSI processes, and rank adaptation |
| Wrapping method | Based on geographical distance |
| Handover margin | 3 dB |
| Metrics | Average UE throughput, 5% UE throughput, 50% UE throughput |

The present invention proposes a method of transmitting or receiving hybrid CSI for a single CSI process in order to support a multiple antenna MIMO system which may be called, for example, enhanced beamforming (EBF), full-dimension MIMO (FD-MIMO), and massive MIMO, and a method of configuring CSI report.

The CSI process report of the class B type is discussed as follows.

The number of antenna ports L for CSI may be 2, 4 or 8, for example. That is, as described above, a plurality of CSI-RS resources (i.e., a plurality of beams) may be configured in the class B type. In this case, the number of CSI-RS antenna ports for each CSI-RS resource may be 2, 4 or 8.

Furthermore, the following four alternatives (or some of them) are defined, and one of the defined alternatives may be used.

Class B Alt. 1:

i) A beam selection indicator (BI) (or a CSI-RS resource indicator (CRI)) may be defined. In this case, the BI (or CRI) may be determined based on reference signal received power (RSRP) or CSI. Furthermore, the BI (or CRI) may be determined over a wideband or may be determined in a subband unit. Furthermore, the BI (or CRI) may be determined in a short term or may be determined in a long term.

ii) A BI bitwidth may be related to K (a total number of beams (or CSI-RS resources)).

iii) UE-specific beamforming for a rank greater than 2 (rank>2) may be supported.

iv) CSI may be reported on a PUCCH/PUSCH according to the uplink control information (UCI) feedback mechanism.

Class B Alt. 2:

i) A codebook for beam selection and co-phasing (e.g., it may be derived from a legacy codebook(s) or a codebook component(s) or may be newly designed) may be used. In this case, an associated PMI may also be reported (e.g., it may be assumed to be newly designed or to be W=W2 within a legacy codebook).

ii) CSI may be reported on a PUCCH/PUSCH according to the UCI feedback mechanism.

Class B Alt. 3:

i) A codebook for beam selection and CSI may be used. In this case, a PMI may include information about a selected beam and a precoding matrix for an L port within the selected beam.

ii) CSI may be reported on a PUCCH/PUSCH according to the UCI feedback mechanism.

Class B Alt. 4:

i) A measurement restriction (MR) mechanism may be used.

Meanwhile, a measurement restriction (MR) may also be applied to the Alt. 1 to the Alt. 3.

A new CSI report of a beam indicator (BI) (or CRI) type is necessary for an beamformed CSI-RS-based operation including aperiodic CSI-RS transmission use cases as described above.

The scheme of the Class B operation may show significant performance when two CSI processes are configured in a UE as follows.

i) A CSI process #1 of Class B: For example, if a CSI process of Alt. 1-based Class B is configured, K(>1) CSI-RS resources may be configured.

An eNB may periodically transmit K CSI-RSs. In this case, the transmission cycle may be long, for example, 50 ms or 100 ms.

A UE may report a BI (or CRI). Furthermore, the UE may report an RI/PMI/CQI measured on a selected CSI-RS in addition to a BI (or CRI).

A BI (or CRI) report cycle may be longer than CSI.

A reported BI (or CRI) may be used to transmit a CSI-RS associated with the CSI process #2.

ii) A CSI process #2 of Class B: For example, if a CSI process of Alt. 4-based Class B is configured, K=1 CSI-RS resource may be configured.

An eNB may apply UE-specific beamforming coefficients when transmitting a CSI-RS using the aforementioned reported BI (or CRI). In this case, the CSI-RS may be transmitted in a single measurement subframe triggered for the UE.

The UE may report an RI/PMI/CQI based on the received CSI-RS. In this case, the UE may report an RI/PMI/CQI based on the single measurement subframe.

As described above, in accordance with an operation of reporting an RI/PMI/CQI based on a single measurement subframe, the configured CSI-RS resource may be reused between multiple UEs. In this case, applied beamforming coefficients may be selected by the eNB in each CSI-RS transmission instance.

As described above, the two CSI process configurations may be configured in a UE, but a combination of the two processes within a single CSI process configuration may be preferred.

As described above, a combination of two (or more) processes of CSI reports within a single CSI process configuration may be called "hybrid CSI." That is, the hybrid CSI means a CSI report type including two (or more) CSI-RS configurations within a single CSI process.

In this case, the type of each CSI-RS configuration may be set as one of Class A and Class B. For example, if an RRC parameter "eMIMO-Type" is set as "non-precoded" with respect to a corresponding CSI-RS configuration, the RRC parameter may correspond to the CSI-RS configuration of Cass A. If the "MIMO-Type" is set as "beamformed", the RRC parameter may correspond to the CSI-RS configuration of Class B.

In the following description of the present invention, for convenience of description, a case where the two CSI-RS configurations (first CSI-RS configuration and second CSI-RS configuration) are included in a single CSI process and the type of each CSI-RS configuration has been set as Class B is chiefly described, but the present invention is not limited thereto.

This is described more specifically. A combined CSI process (i.e., hybrid CSI) may have K+1 CSI-RS resources. In this case, the CSI feedback of a UE may be based on a "single particular CSI-RS resource", and BI (or CRI) feedback may be based on the remaining K CSI-RS resources. In other words, the first CSI-RS configuration (i.e., the first eMIMO-type) may correspond to a Class B CSI-RS configuration having K (>1) CSI-RS resources, and the second CSI-RS configuration (i.e., the second eMIMO-type) may correspond to a Class B CSI-RS configuration having one CSI-RS resource.

In this case, the particular CSI-RS resource may be fixedly defined or may be configured in a UE as a CSI-RS resource to which the highest or lowest index has been assigned among the K+1 CSI-RS resources.

Alternatively, a particular CSI-RS resource(s) that belongs to the K+1 CSI-RS resources and that is indicated through high layer signaling (e.g., RRC signaling) may be configured through the aforementioned object (e.g., CSI-RS resource pooling between UEs or an aperiodic CSI-RS transmission use case).

For a more detailed example, if a total of K+1=5 CSI-RSs are configured within the single CSI process (i.e., a hybrid beamformed CSI-RS transmission object), a case where the CSI-RS 1 of the 5 CSI-RSs is configured in a 5 ms cycle (a form in which the CSI_RS 1 is shared between users through aperiodic pooling and a measurement restriction may also be active (MR-on). For example, "one-shot MR" (channel measurement may be derived based on an NZP CSI-RS resource or interference measurement may be derived based on a CSI-IM resource only in a 1 subframe or a previously set short window period)), and the remaining CSI-RSs 2-5 are configured in a 50 ms cycle, and the 5 CSI-RSs are periodically transmitted as different cell-specific beamformed (BFed) CSI-RSs may be taken into consideration.

In such a configuration situation (i.e., a situation in which hybrid CSI has been configured), when an aperiodic CSI (A-CSI) report is triggered by an eNB according to the UL DCI format, a UE may perform the A-CSI report according to at least one method of the following options.

Option 1: The UE may report both a BI (or CRI) and CSI to the eNB at once (e.g., within one subframe). In other words, the UE may report CSI for the first CSI-RS configuration (i.e., the first eMIMO-type) and CSI for the second CSI-RS configuration (i.e., the second eMIMO-type) the eNB at once.

In this case, if the above example is assumed, when a BI (or CRI) is calculated, a preferred BI (or CRI) may be calculated by comparing only four CSI-RS resources and reported. When the CSI is calculated, for example, the CSI-RS 1 to which the lowest index has been assigned may be calculated and CSI may be reported.

Characteristically, the meaning of the BI (or CRI) feedback in this case is characterized in that two reports of a separated concept, including reporting a preferred BI (or CRI) at the present instance for a subsequent A-CSI report for the purpose of the future in advance and a CSI report for a corresponding beamformed (BFed) CSI-RS1 that is now applied, are merged at the present instance and reported.

That is, interdependence is not present between the first CSI-RS configuration (i.e., the first eMIMO-type) and second CSI-RS configuration (i.e., the second eMIMO-type) included in the hybrid CSI configured in the UE for CSI (e.g., CQI, PMI, RI) calculation.

In other words, CSI (e.g., CQI, PMI, RI) for the second CSI-RS configuration (i.e., the second eMIMO-type) is derived independently of the first CSI-RS configuration (i.e., the first eMIMO-type) (or CSI-RS resource indicated by a BI (or CRI)).

Option 2: as another method, upon the A-CSI report for A-CSI triggering, it may be defined or may be configured to the UE that the UE reports only CSI (e.g., RI, PMI, CQI).

That is, in BI feedback, a preferred BI (or CRI) may be reported in another report form, such as that BI feedback is periodically reported. In such an A-CSI report, the aperiodical triggering of a CSI report for only a corresponding beamformed (BFed) CSI-RS1 that is now applied may be recognized by the UE, and a UE operation may be performed.

Option 3: In contrast, upon the A-CSI report for the A-CSI triggering, it may be defined or may be configured to the UE that the UE reports only a BI (or CRI).

As a mixed form of the aforementioned methods, upon the A-CSI triggering, what the UE will perform an A-CSI report according to which one of the options and a method of performing dynamic indication (e.g., using first layer (PHY) control signaling (i.e., PDCCH)) upon A-CSI triggering may also be applied.

For example, as in the aforementioned options 2 and 3, when the A-CSI report is triggered, the UE may report only CSI (i.e., only at least one of specific CSI contents, such as a BI/CRI, RI, PMI, and CQI previously associated with a corresponding CSI-RS configuration) for any one of the first CSI-RS configuration (i.e., the first eMIMO-type) and the second CSI-RS configuration (i.e., the second eMIMO-type) to the eNB. In this case, the eNB may indicate that the UE has to report the CSI (i.e., only at least one of the specific CSI contents, such as a BI/CRI, RI, PMI, and CQI previously associated with a corresponding CSI-RS configuration) for any one of the first CSI-RS configuration (i.e., the first eMIMO-type) and the second CSI-RS configuration (i.e., the second eMIMO-type) by including a 1-bit indicator in a DCI for triggering the A-CSI report.

Alternatively, what the UE will perform the A-CSI report according to which one of the options may be configured through a high layer signal (e.g., RRC signaling).

Furthermore, in such a configuration situation (i.e., a situation in which hybrid CSI has been configured), in the case of a periodic CSI (P-CSI) report, the UE may calculate a preferred BI (or CRI) for the CSI-RSs 2-5 with respect to a BI (or CRI) report instance and report the preferred BI (or CRI), and may perform CSI measurement for the CSI-RS1 in a form in which a specific MR has always been applied with respect to other CSI report instances and report the measured CSI.

In this case, if the MR is not a single subframe MR, but a measurement window having a specific interval has been configured in the MR, an operation in which the UE initializes the measurement window from an instance at which a preferred BI has been specially reported as a different value (i.e., reported as a value different from a previously reported BI (or CRI)) (or from a subsequent m (=0 or 4) subframe) may also be applied.

That is, the reason for this is that a new measurement window is applied from an instance at which since the BI has been changed, measurement averaging is initialized and beamforming coefficients to be newly applied by the eNB are incorporated into the CSI-RS1 and transmitted.

Hereinafter, a method of configuring the hybrid CSI in a UE is described. An eNB may configure the hybrid CSI in the UE through high layer signaling (e.g., RRC signaling).

A CSI process may be configured in a UE as a "CSI-Process", that is, an RRC information element (IE). The CSI-Process is a CSI process configuration which may be configured by a network on a serving frequency. An "CSI-Process" IE includes "csi-RS-ConfigNZPId", that is, an RRC parameter. "csi-RS-ConfigNZPId" indicates an NZP CSI-RS configuration configured in the same frequency as that of the CSI process. That is, 1 NZP CSI-RS configuration is configured in the UE by default.

Furthermore, in the case of Rel-13 UE, eMIMO-type, that is, an RRC parameter, is additionally configured. As described above, eMIMO-type indicates "nonPrecoded" and "beamformed" values respectively corresponding to "CLASS A" and "CLASS B." Furthermore, a CSI-RS configuration (i.e., a "CSI-RS-ConfigNonPrecoded" field) corresponding to "CLASS A" and a CSI-RS configuration (i.e., a "CSI-RS-ConfigBeamformed" field) corresponding to "CLASS B" are configured in a UE based on the eMIMO-type value.

For example, the hybrid CSI may be indicated by eMIMO-type included in "CSI-Process." In this case, two CSI-RS configurations may be included in a hybrid CSI configuration as follows.

i) As described above, if the Class B CSI-RS configuration (i.e., the first CSI-RS configuration or the first eMIMO-type) having K (>1) CSI-RS resources and the Class B CSI-RS configuration (i.e., the second CSI-RS configuration or the second eMIMO-type) having one CSI-RS resource are configured in a UE as the hybrid CSI, two "CSI-RS-ConfigBeamformed" fields specifying the respective CSI-RS configurations may be configured in the UE.

In this case, "CSI-RS-ConfigBeamformed" for specifying the first CSI-RS configuration (i.e., the first eMIMO-type) may include (1~7) (i.e., K−1) NZP CSI-RS configurations (because one NZP CSI-RS configuration has already been configured in the UE by default). "CSI-RS-ConfigBeamformed" for specifying the second CSI-RS configuration (i.e., the second eMIMO-type) may include one NZP CSI-RS configuration.

Alternatively, "CSI-RS-ConfigBeamformed" for specifying the first CSI-RS configuration (i.e., the first eMIMO-type) may include (1~8) (i.e., K) NZP CSI-RS configurations and may be defined to calculate a BI or CRI with respect to the K NZP CSI-RSs configured as described above. "CSI-RS-ConfigBeamformed" for specifying the second CSI-RS configuration (i.e., the second eMIMO-type) may not include an NZP CSI-RS configuration (since one NZP CSI-RS configuration has been configured in the UE by default, "CSI-RS-ConfigBeamformed" may be defined to apply the one NZP CSI-RS configuration). In addition, configuration methods of modified forms having the object may be present.

In this case, an RRC parameter ("channelMeasRestriction") indicative of the ON/OFF of a channel measurement restriction (MR) in each "CSI-RS-ConfigBeamformed" for specifying each CSI-RS configuration may be independently configured in the first CSI-RS configuration (i.e., the first eMIMO-type) and the second CSI-RS configuration (i.e., the second eMIMO-type). This is for reporting relatively long term and/or wideband PMI (i.e., channel direction) information in the first CSI-RS configuration, and the second CSI-RS configuration is for reporting a relatively short term and/or narrowband CSI. Accordingly, the targets and objects of measurement/report thereof are different. Accordingly, there is an advantage in a flexible operation suitable for various environments if a channel MR ON/OFF function is independently configured. For example, the first CSI-RS configuration and the second CSI-RS configuration may have a different in the configuration, such as that the first CSI-RS configuration is a long term and thus performance may be determined to be deteriorated when measurement averaging is performed by a UE or MR-ON may be set for a beamformed CSI-RS resource sharing object, whereas in the second CSI-RS configuration, MR-OFF is set as in a legacy operation. Furthermore, although the first CSI-RS configuration is a relatively long term, a noise suppression gain through measurement averaging can be expected by setting MR-OFF with respect to the first CSI-RS configuration. The second CSI-RS configuration can obtain a beamformed CSI-RS resource sharing effect in a short-term level by setting MR-ON with respect to the second CSI-RS configuration.

Alternatively, an RRC parameter ("channelMeasRestriction") indicative of the ON/OFF of a channel measurement restriction (MR) may be configured in common within a specific CSI process in which both the first CSI-RS configuration (i.e., the first eMIMO-type) and the second CSI-RS configuration (i.e., the second eMIMO-type) are configured. Accordingly, a restriction may be applied so that CSI derivation is performed by applying common MR ON/OFF when performing channel measurement on the first CSI-RS configuration and the second CSI-RS configuration having an associated object. Accordingly, there is an advantage in that a UE operation and complexity are simplified in the CSI calculation process within the one integrated CSI process. That is, if MR ON is set, when the entire channel measurement is performed on a corresponding CSI process, a measurement operation may be always performed on only a measurement sample for a single subframe. If MR OFF is set, a simpler UE implementation can be supported so that a single operation process, such as specific moving averaging and weighted averaging, is consistently applied. For example, MR-ON or MR-OFF can be generally selectively set within the hybrid CSI process depending on whether an implementation of a corresponding eNB that transmits beamformed CSI-RS resources uses beamformed CSI-RS resource sharing along with other UEs within a corresponding cell. Accordingly, there are advantages in that the complexity of unnecessary signaling can be reduced and the easiness of an implementation can be supported.

ii) Alternatively, "CSI-RS-ConfigBeamformed" for specifying the first CSI-RS configuration may include (1~8) (i.e., K) NZP CSI-RS configurations (what a specific one of the NZP CSI-RS configurations will be applied as the second CSI-RS configuration has been previously defined or configured according to one of the following methods). As described above, any one NZP CSI-RS configuration (e.g., an NZP CSI-RS configuration to which the lowest index 1 or the highest index 8 has been assigned or an NZP CSI-RS configuration configured by default) may be previously defined to correspond to the second CSI-RS configuration or configured in a UE.

In this case, an RRC parameter ("channelMeasRestriction") indicative of the ON/OFF of a channel measurement restriction (MR) may be configured in the first CSI-RS configuration (i.e., the first eMIMO-type) and the second CSI-RS configuration (i.e., the second eMIMO-type) in common.

iii) Alternatively, the second CSI-RS configuration may be defined so that the NZP CSI-RS configuration configured in the UE by default is the same. Furthermore, "CSI-RS-ConfigBeamformed" for specifying the first CSI-RS configuration may include (1~8) (i.e., K) NZP CSI-RS configurations.

The aforementioned range of the parameter K is only an example and it is evident that a K value having a greater range may be supported.

Since "hybrid CSI" is configured as described above, when a UE is served along with a CoMP operation, the hybrid CSI can be more effective so that a single CSI process is used for one transmission point (TP) in such a manner that a maximum number of TPs that provides service to the UE is not limited.

Furthermore, since the hybrid CSI is configured in the UE, there is an effect in that uplink signaling overhead can be reduced compared to a case where two CSI processes are individually configured in the UE.

For example, a case where two CSI processes are individually configured in a UE and all configured as the CSI report of the class B type is assumed. For example, the CSI-RS resource of the first CSI process may be configured as a relative long term, and the CSI-RS resource of the second CSI process may be configured as a relatively short term. In this case, in accordance with the existing CSI report method, the UE reports an RI/PMI/CQI for a CSI-RS resource indicated by a BI (or CRI) to an eNB in addition to the BI (or CRI) with respect to the first CSI process. Furthermore, likewise, the UE reports an RI/PMI/CQI for K=1 CSI-RS resource to the eNB with respect to the second CSI process. That is, in this case, the UE reports both a BI (or CRI) and/or an RI/PMI/CQI to the eNB for each configured CSI process.

In contrast, if hybrid CSI is configured in the UE, in accordance with the aforementioned example, the first CSI report type (i.e., the first eMIMO-type) is the class B CSI report based on K>1 CSI-RS resources, and thus only a BI (or CRI) may be reported (i.e., without a CQI/PMI/RI). The second CSI report type (i.e., the second eMIMO-type) is the class B CSI report based on K=1 CSI-RS resource, and thus only a CQI/PMI/RI may be reported (i.e., without a BI (or CRI)). Accordingly, there is an effect in that uplink signaling overhead can be reduced compared to a case where two CSI processes have been configured in the UE according to the existing CSI report method.

Furthermore, there is an effect in that a larger number of CSI processes can be configured in the UE because the hybrid CSI is configured in the UE.

For example, if a carrier aggregation (CA) is applied, a maximum number (e.g., 1, 3, 4) of CSI processes that may be configured in a UE with respect to one component carrier (CC) has been limited. Furthermore, a maximum number (e.g., 20) of CSI processes that may be configured in a UE with respect to all of CCs have been limited. Accordingly, if hybrid CSI is configured in a UE, a larger number of CSI processes can be additionally configured in the corresponding UE compared to a case where two CSI processes are configured in the UE according to the existing CSI report method.

Meanwhile, the aforementioned method of utilizing two CSI processes means that the BI and CSI report operations may be individually separated into two CSI processes.

In this case, a UE may report CSI to an eNB in addition to a BI (or CRI) with respect to the CSI process #1. In this case, the reported CSI is CSI calculated with respect to a CSI-RS resource that belongs to the long term four CSI-RSs 2~5 and that corresponds to the reported BI (or CRI).

That is, as described above, a CQI reported for a current short term beamformed (BFed) CSI-RS1 is compared through the CQI value of the reported CSI. Accordingly, an eNB can use the CQI in order to determine the improvement of a CQI when a beam change is applied by applying the newly reported BI (or CRI).

Alternatively, the eNB may neglect CSI received along with a BI (or CRI) as described above and may use only BI information depending on an eNB implementation.

FIG. 13 is a diagram illustrating a method of transmitting or receiving channel state information according to an embodiment of the present invention.

Referring to FIG. 13, a UE receives configuration information for a single CSI process comprising a first CSI-RS configuration and a second CSI-RS configuration from an eNB (S1301).

That is, the single CSI process comprising the first CSI-RS configuration and the second CSI-RS configuration may correspond to a CSI process in which the aforementioned hybrid CSI report type has been configured.

For example, the first CSI-RS configuration may be a CSI-RS configuration associated with K CSI-RS resources greater than 1 of a beamformed CSI-RS type (i.e., Class B), and the second CSI-RS configuration may be a CSI-RS configuration associated with one CSI-RS resource of a beamformed CSI-RS type (i.e., Class B).

The K CSI-RS resources associated with the first CSI-RS configuration and the one CSI-RS resource associated with the second CSI-RS configuration may be independently configured.

Alternatively, one CSI-RS resource that belongs to the K CSI-RS resources associated with the first CSI-RS configuration and that is associated with the second CSI-RS configuration may be configured. As described above, for example, a CSI-RS resources that belongs to the K CSI-RS resources associated with the first CSI-RS configuration and to which the highest or lowest index has been assigned may be determined to be one CSI-RS resource associated with the second CSI-RS configuration.

Furthermore, measurement restrictions may be separately applied to the first CSI-RS configuration and the second CSI-RS configuration, or a measurement restriction may be applied to the first CSI-RS configuration and the second CSI-RS configuration in common (in an integrated manner).

The UE reports an indicator (i.e., BI or CRI), derived based on the first CSI-RS configuration, to the eNB (S1302).

The UE reports a CQI/PMI/RI, derived based on the second CSI-RS configuration, to the eNB (S1303).

In this case, the UE may derive one or more of the CQI, PMI and RI based on the second CSI-RS configuration, and may report the derived one or more of the CQI, PMI and RI to the eNB.

Furthermore, the CQI/PMI/RI may be calculated independently of the first CSI-RS configuration. That is, in calculating the CQI/PMI/RI, interdependence may not be present between the first CSI-RS configuration and the second CSI-RS configuration.

As described above, if an aperiodic CSI report is triggered, the indicator (i.e., BI or CRI) derived based on the first CSI-RS configuration and the CQI/PMI/RI derived based on the second CSI-RS configuration may be together reported to the eNB. That is, in this case, step S1302 and step S1303 may be performed together.

Alternatively, if an aperiodic CSI report is triggered, only any one of the indicator (i.e., BI or CRI) derived based on the first CSI-RS configuration and the CQI/PMI/RI derived based on the second CSI-RS configuration may be reported to the eNB. In this case, the eNB may indicate that which one of the indicator (i.e., BI or CRI) derived based on the first CSI-RS configuration and the CQI/PMI/RI derived based on the second CSI-RS configuration has to be reported for the UE using a 1-bit indicator.

As described above, in the case of the periodic CSI report, the indicator (i.e., BI or CRI) derived based on the first CSI-RS configuration may be reported at an indicator report occasion, and the CQI/PMI/RI derived based on the second CSI-RS configuration may be reported at a CSI report occasion other than the indicator report occasion.

General Apparatus to which the Present Invention May be Applied

FIG. 14 illustrates a block diagram of a wireless communication apparatus according to an embodiment of the present invention.

Referring to FIG. 14, the wireless communication system includes a base station (eNB) 1410 and a plurality of user equipments (UEs) 1420 located within the region of the eNB 1410.

The eNB 1410 includes a processor 1411, a memory 1412 and a radio frequency unit 1413. The processor 1411 implements the functions, processes and/or methods proposed in FIGS. 1 to 19 above. The layers of wireless interface protocol may be implemented by the processor 1411. The memory 1412 is connected to the processor 1411, and stores various types of information for driving the processor 1411. The RF unit 1413 is connected to the processor 1411, and transmits and/or receives radio signals.

The UE 1420 includes a processor 1421, a memory 1422 and a radio frequency unit 1423. The processor 1421 implements the functions, processes and/or methods proposed in FIGS. 1 to 13 above. The layers of wireless interface protocol may be implemented by the processor 1421. The memory 1422 is connected to the processor 1421, and stores various types of information for driving the processor 1421. The RF unit 1423 is connected to the processor 1421, and transmits and/or receives radio signals.

The memories 1412 and 1422 may be located interior or exterior of the processors 1411 and 1421, and may be connected to the processors 1411 and 1421 with well known means. In addition, the eNB 1410 and/or the UE 1420 may have a single antenna or multiple antennas.

The embodiments described so far are those of the elements and technical features being coupled in a predetermined form. So far as there is not any apparent mention, each of the elements and technical features should be considered to be selective. Each of the elements and technical features may be embodied without being coupled with other elements or technical features. In addition, it is also possible to construct the embodiments of the present invention by coupling a part of the elements and/or technical features. The order of operations described in the embodiments of the present invention may be changed. A part of elements or technical features in an embodiment may be included in another embodiment, or may be replaced by the elements and technical features that correspond to other embodiment. It is apparent to construct embodiment by combining claims that do not have explicit reference relation in the following claims, or to include the claims in a new claim set by an amendment after application.

The embodiments of the present invention may be implemented by various means, for example, hardware, firmware, software and the combination thereof. In the case of the hardware, an embodiment of the present invention may be implemented by one or more application specific integrated circuits (ASICs), digital signal processors (DSPs), digital signal processing devices (DSPDs), programmable logic devices (PLDs), field programmable gate arrays (FPGAs), a processor, a controller, a micro controller, a micro processor, and the like.

In the case of the implementation by the firmware or the software, an embodiment of the present invention may be implemented in a form such as a module, a procedure, a function, and so on that performs the functions or operations described so far. Software codes may be stored in the memory, and driven by the processor. The memory may be located interior or exterior to the processor, and may exchange data with the processor with various known means.

It will be understood to those skilled in the art that various modifications and variations can be made without departing from the essential features of the inventions. Therefore, the detailed description is not limited to the embodiments described above, but should be considered as examples. The scope of the present invention should be determined by reasonable interpretation of the attached claims, and all modification within the scope of equivalence should be included in the scope of the present invention.

INDUSTRIAL APPLICABILITY

The present invention has been described based on an example in which it is applied to the 3GPP LTE/LTE-A systems, but may be applied to various wireless communication systems in addition to the 3GPP LTE/LTE-A systems.

The invention claimed is:

1. A method for transmitting channel state information (CSI) by a user equipment (UE) in a wireless communication system, the method comprising:
    receiving, from a base station (BS), configuration information for a single CSI process comprising (i) a first channel state information-reference signal (CSI-RS) configuration related with more than one CSI-RS resources of a beamformed CSI-RS based CSI reporting and (ii) a second CSI-RS configuration related with one CSI-RS resource of the beamformed CSI-RS based CSI reporting;
    transmitting, to the BS, first information representing a CSI-RS resource of the more than one CSI-RS resources based on the first CSI-RS configuration;
    transmitting, to the BS, second information for the one CSI-RS resource based on the second CSI-RS configuration,
    wherein a measurement restriction is applied to a second information reporting occasion and is configured to a measurement window having a specific interval; and
    initializing by the UE, the measurement window based on a change of the first information.

2. The method of claim 1, wherein the one CSI-RS resource is determined as a CSI-RS resource to which a highest or lowest index has been assigned among CSI-RS resources of the single CSI process.

3. The method of claim 1, wherein the second information is calculated independently of the first CSI-RS configuration.

4. The method of claim 1, wherein based on triggering of an aperiodic CSI report, the first information and the second information are together reported to the BS.

5. The method of claim 1, wherein based on triggering of an aperiodic CSI report, only one of the first information and the second information is reported to the BS.

6. The method of claim 1, wherein in a periodic CSI report, the first information is reported at a first information reporting occasion, and the second information is reported at the second information reporting occasion other than the first information reporting occasion.

7. The method of claim 1, wherein measurement restrictions are individually applied to the first CSI-RS configuration and the second CSI-RS configuration.

8. The method of claim 1, wherein a measurement restriction is applied to the first CSI-RS configuration and the second CSI-RS configuration in common.

9. The method of claim 1, wherein the second information related with the first CSI-RS configuration is skipped to be transmitted to the BS.

10. The method of claim 1, wherein the second information comprises at least one of a channel quality indicator (CQI), a precoding matrix indicator (PMI) or a rank indicator (RI).

11. The method of claim 1, further comprising:
    receiving, from the BS. a dynamic indication; and
    transmitting, to the BS, at least one of the first information or the second information based on the dynamic indication.

12. The method of claim 11, wherein the dynamic indication is configured to 1 bit.

13. The method of claim 1, wherein a period of the more than one CSI-RS resources is different from a period of the one CSI-RS resource.

14. The method of claim 13, wherein the period of the more than one CSI-RS resources is longer than the period of the one CSI-RS resource.

15. A user equipment (UE) for transmitting channel state information (CSI) in a wireless communication system, the UE comprising:
    a radio frequency (RF) unit configured to transmit or receive a radio signal; and
    a processor configured to control the RF unit,
    wherein the processor is configured to:
    receive, from a base station (BS), configuration information for a single CSI process comprising (i) a first channel state information-reference signal (CSI-RS) configuration related with more than one CSI-RS resources of a beamformed CSI-RS based CSI reporting and (ii) a second CSI-RS configuration related with one CSI-RS resource of the beamformed CSI-RS based CSI reporting;
    transmit, to the BS, first information representing a CSI-RS resource of the more than one CSI-RS resources based on the first CSI-RS configuration;
    transmit, to the BS, second information for the one CSI-RS resource based on the second CSI-RS configuration,
    wherein a measurement restriction is applied to a second information reporting occasion and is configured to a measurement window having a specific interval; and
    initialize the measurement window based on a change of the first information.

* * * * *